(12) United States Patent
Jacob et al.

(10) Patent No.: US 11,327,940 B2
(45) Date of Patent: May 10, 2022

(54) INTERLINKED TUPLES IN COORDINATION NAMESPACE

(71) Applicant: International Business Machines Corporation, Armonk, NY (US)

(72) Inventors: Philip Jacob, Congers, NY (US); Philip Neil Strenski, Yorktown Heights, NY (US); Charles Johns, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 16/719,340

(22) Filed: Dec. 18, 2019

(65) Prior Publication Data
US 2021/0191914 A1 Jun. 24, 2021

(51) Int. Cl.
| G06F 16/00 | (2019.01) |
| G06F 16/22 | (2019.01) |
| G06F 9/38  | (2018.01) |
| G06F 9/54  | (2006.01) |

(52) U.S. Cl.
CPC ........ *G06F 16/2255* (2019.01); *G06F 9/3877* (2013.01); *G06F 9/546* (2013.01); *G06F 16/2246* (2019.01)

(58) Field of Classification Search
None
See application file for complete search history.

(56) References Cited

U.S. PATENT DOCUMENTS

| 8,204,856 B2 * | 6/2012 | Meyer ................... G06F 16/972 707/623 |
| 8,255,430 B2 | 8/2012 | Dutton et al. |
| 8,806,615 B2 * | 8/2014 | Ahuja ................. H04L 63/1416 707/625 |
| 10,031,934 B2 * | 7/2018 | Dietterich ............. G06F 16/215 |
| 10,084,634 B2 | 9/2018 | Leppanen et al. |

(Continued)

OTHER PUBLICATIONS

Anonymous, "Method and System to detect when a face-to-face meeting is occurring, recording actions and share among participants", IP.com, IPCOM000254720D, Jul. 25, 2018, 4 pages.

(Continued)

*Primary Examiner* — Jean M Corrielus
(74) *Attorney, Agent, or Firm* — Scully, Scott, Murphy & Presser, PC; Daniel P. Morris, Esq.

(57) ABSTRACT

A system and method for supporting tuple record interlinking in one or more tuple space/coordinated namespace (CNS) extended memory storage systems. A system-wide CNS provides for efficient storing and communicating of data generated by local processes running at the nodes, and coordinated to generate a union/intersection of multiple CNS where tuple records are interlinked in multiple CNS hashtables, and/or share tuple data between two sets of processes that are part of different CNSs. Local node processes further generate multi-key tuples where two or more tuple records are interlinked within the same CNS hash table, thereby permitting a look up of the tuple data by either tuple name/keys. A CNS controller further provides a tuple iterator for a key-value storage in a CNS system that adds more links between tuples enables creation of iterator structures such as linked list or trees etc. of "different" tuples in a tuple database.

18 Claims, 12 Drawing Sheets

(56) References Cited

U.S. PATENT DOCUMENTS

| | | | |
|---|---|---|---|
| 10,244,053 B2 | 3/2019 | Bestler et al. | |
| 10,275,179 B2 | 4/2019 | Petrocelli | |
| 10,915,400 B1* | 2/2021 | Muchherla | G06F 11/076 |
| 11,023,291 B2* | 6/2021 | Jacob | G06F 9/546 |
| 11,144,223 B2* | 10/2021 | Huang | G06F 3/0604 |
| 2010/0121839 A1* | 5/2010 | Meyer | G06F 16/972 |
| | | | 707/720 |
| 2012/0203740 A1* | 8/2012 | Ben-Dyke | G06F 16/284 |
| | | | 707/639 |
| 2014/0201753 A1* | 7/2014 | He | G06F 9/4881 |
| | | | 718/104 |
| 2016/0065490 A1 | 3/2016 | Leff et al. | |
| 2016/0217077 A1* | 7/2016 | Ambroladze | G06F 12/0855 |
| 2017/0170955 A1 | 6/2017 | Wood et al. | |
| 2018/0011892 A1* | 1/2018 | Kimura | G06F 16/2228 |
| 2018/0203641 A1* | 7/2018 | Petrocelli | G06F 3/0659 |
| 2020/0341704 A1* | 10/2020 | Tajima | G06F 3/1222 |
| 2020/0356419 A1* | 11/2020 | Jacob | G06F 9/546 |
| 2020/0394077 A1* | 12/2020 | Jacob | G06F 9/5016 |
| 2021/0097202 A1* | 4/2021 | Datta | G06F 21/6227 |
| 2021/0191727 A1* | 6/2021 | Jacob | G06F 9/3838 |
| 2021/0194958 A1* | 6/2021 | Jacob | H04L 12/18 |

OTHER PUBLICATIONS

Mariani et al., "Novel Opportunities for Tuple-based Coordination: XPath, the Blockchain, and Stream Processing", 18th Workshop From Objects to Agents (WOA 2017), Scilla, RC, Italy, Jun. 16, 2017, 4 pages.

Belyaev et al., "Component-oriented access control-Application servers meet tuple spaces for the masses", Future Generation Computer Systems, 2017, Accepted May 5, 2017, pp. 1-14.

Anonymous, "A Method to Support Multiple Keys in Table Lookup Engines", IP.com, IPCOM000246002D, Apr. 25, 2016, 8 pages.

Anonymous, "Method for smart namespace schema discovery for third party data source providers of linked data", IP.com, IPCOM000231061D, Sep. 25, 2013, 4 pages.

IBM, "A method for efficient creation of notifications in SIP", IP.com, IPCOM000188098D, Sep. 22, 2009, 3 pages.

Bicocchi et al., "Context-Aware Coordination in the Sensors' Continuum", Ubiquitous Computing and Communication Journal, CPE—Special Issue,—ISSN 1992-8424, 2008, pp. 1-12.

Nixon et al., "Coordinating Knowledge in Pervasive Environments", Ubiquitous Computing and Communication Journal, Jan. 2007, Conference: 16th IEEE International Workshops on Enabling Technologies: Infrastructures for Collaborative Enterprises (WETICE 2007), Jun. 18-20, 2007, Paris, France, pp. 1-13.

IBM, "Supporting Namespaces in Meta-Models That Have No Direct Namespace Support", IP.com, IPCOM000021493D, Jan. 21, 2004, 6 pages.

Murphy et al., "LIME: A Coordination Middleware Supporting Mobility of Agents and Hosts", Washington University in St. Louis, Department of Comuputer Science & Engineering, St. Louis, MO, 63130, Apr. 7, 2003, pp. 1-28.

Carbunar et al., "Coordination and Mobility in CoreLime", Math. Struct. in Comp. Science, pp. 1-24.

Rossi et al., Tuple-based technologies for coordination, Apr. 8, 2005, pp. 1-27.

Papadopoulos et al., "Coordination of Distributed and Parallel Activities in the IWIM Model", International Journal of High Speed Computing 9(02):127-160 • Jun. 1997, pp. 1-37.

Jagannathan, "Optimzing Analysis for First-Class Tuple-Spaces", Department of Computer Science, Yale University, New Haven, CT 06520, MIT Press, 1991, pp. 1-23.

* cited by examiner

INTERLINKED TUPLES IN COORDINATION NAMESPACE

STATEMENT REGARDING FEDERALLY SPONSORED RESEARCH OF DEVELOPMENT

This invention was made with U.S. Government support under Contract. No. B621073 awarded by the Department of Energy. The government has certain rights to this invention.

FIELD

The present invention generally relates to distributed memory architectures and memory management, and particularly a hardware acceleration mechanism for supporting interlinking of tuples including the linking of tuple records in a single or multiple Coordination Namespace (CNS) system and the sharing of tuple data between two sets of processes that are attached to the same or different CNSs.

BACKGROUND

When tuples for data generated by a set of processes in a first coordination namespace, e.g., CNS1, and a second set of processes create tuples for data in a second coordination namespace, e.g., CNS2, it could become necessary for a third set of processes to access only the common set of tuples in both these coordination namespaces, e.g., CNS1 and CNS2.

It can be further necessary to create tuples being as part of two or more CNS systems that share data and that avoids duplicating data owned by processes in the two CNS systems.

SUMMARY

A hardware and software accelerated system and method for supporting linking and sharing of tuples in two or more coordination namespace (CNS) systems but only storing one copy of the associated data.

A hardware and software accelerated system and method for supporting a union/intersection of multiple CNSs and enable an interlinking of tuples by linking tuple records in multiple CNS tables.

A system and method that enables creation of tuples that are part of two CNS systems without duplicating data in a memory such as a storage class memory (SCM) by providing virtual pointers to data in SCM.

A system and method that enables creation and sharing of tuples across two or more (shared) CNS systems that ensures when a tuple is deleted from one CNS that reference to it the tuple is additionally deleted in the shared CNSs.

A system and method that enables creation, sharing and linking of tuples across two or more (shared) CNS systems and assigns to a created tuple a first key (key 1) and an additional field(s) (key 2) that references key 1 to provide an option to search for the tuple using key 1 or key 2 such that the same data can be accessed by either key 1 or key 2.

A system and method providing for the adding of links between tuples to provide linked tuple structures (such as linked list, linked graphs, and trees) in a distributed CNS. Adding the links allows an iterator to walk the data structure and follow the links.

In one aspect, there is provided a method linking tuples generated by a plurality of processes running at one or more distributed computing nodes implementing one or more coordination namespace systems. The method comprises: receiving, at a controller at a current node, a request message to share data associated with a first process running at nodes in a computing system; generating, by the controller, in response to the request, a first key-value storage tuple record having a pointer field pointing to a first associated data generated by the first process, the first tuple record identified according to a first tuple name; generating, by the controller, a second key-value storage tuple and associated second tuple record, the second tuple record identified according to a second tuple name, the second tuple record having a pointer field pointing to a second associated data; obtaining, by the controller, an address location of the second tuple record identified according to the second tuple name; creating, by the controller, a pointer link in the first tuple record pointing to the address location of the second tuple record, the pointer linking the first key-value storage tuple record to the second key-value storage tuple record, and creating, by the controller, a second pointer in the second tuple record pointing to an address location of the first tuple record, the second pointer linking the second key-value storage tuple record to the first key-value storage tuple record.

In accordance with a further aspect of the invention, there is provided a system for linking tuples generated by a plurality of processes running at one or more distributed computing nodes implementing one or more coordination namespace systems. The system comprises: a controller circuit associated with a current node of the multi-node computing system, the controller circuit configured to perform a method to: receive a request message to share data associated with a first process running at nodes in a computing system; generate in response to the request, a first key-value storage tuple record having a pointer field pointing to a first associated data generated by the first process, the first tuple record identified according to a first tuple name; generate a second key-value storage tuple and associated second tuple record, the second tuple record identified according to a second tuple name, the second tuple record having a pointer field pointing to a second associated data; obtain an address location of the second tuple record identified according to the second tuple name; create a pointer link in the first tuple record pointing to the address location of the second tuple record, the pointer linking the first key-value storage tuple record to the second key-value storage tuple record, and create a second pointer in the second tuple record pointing to an address location of the first tuple record, the second pointer linking the second key-value storage tuple record to the first key-value storage tuple record.

The present invention is advantageously employed in a multiprocessing computer system having a plurality of processor devices each competing for access to a shared memory structure, however, can easily be adapted for use in multi-core uniprocessor computer systems.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

Figure 1:
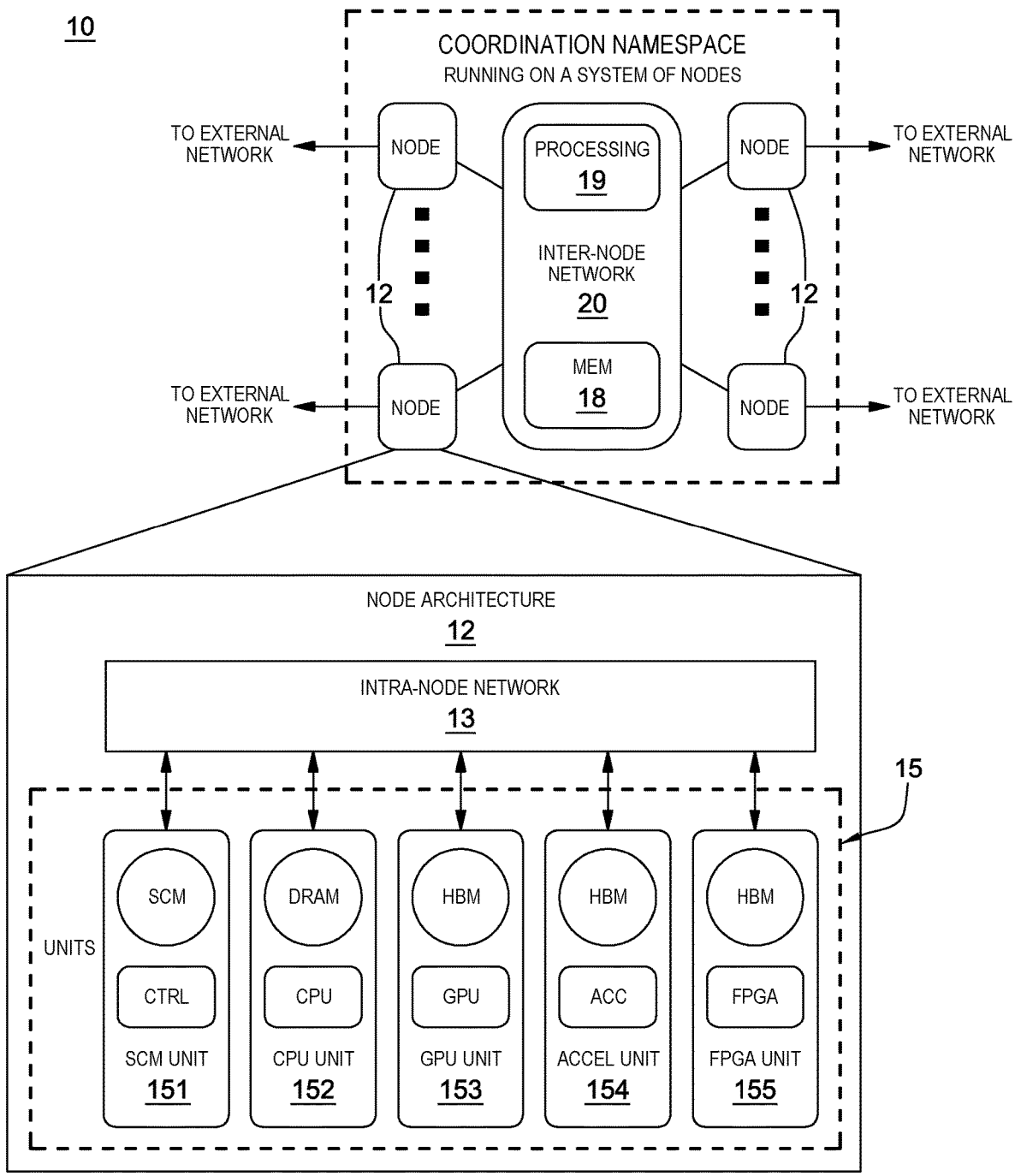
FIG. 1 illustrates an extended memory architecture constructed using a node architecture of multiple processing nodes in which the present systems and methods are employed according to embodiments herein.

The present disclosure provides a novel hardware and software acceleration mechanism to support operations for linking and sharing of Named Data Elements (NDEs) or "tuples" and their associated data generated by processes in a multi-node computing system having an extended memory defining two or more coordination namespace (CNS) systems.

According to embodiments, the tuple space/coordination namespace systems provide an architecture for creating and linking tuples that are part of two or more separate CNS systems and the sharing of associated data. Linked tuples share data by including a pointer to associated data in one tuple record and any tuple record linked to that tuple can access the same data. Thus, data can be shared by the linked tuples without duplicating data in another memory (e.g., a storage class memory). In an embodiment, a method includes providing a tuple record with a virtual link pointer pointing to an associated tuple in a second CNS. In an embodiment, information on connectivity (virtual link) of tuples are stored in the meta data of the tuple. The linked tuple can share the data pointed to by a data address pointer associated with the first tuple. Nodes at two or more coordination namespace systems provide an architecture to create and link tuples across the two or more (shared) CNS systems and further ensures that a same tuple data is part of both coordination namespaces. When a tuple is deleted from one CNS that reference to it, the tuple is additionally deleted in the shared CNSs.

The coordination namespaces further provide an architecture such that a same tuple data can be retrieved by more than one key in same coordination namespace. The CNS architecture enables creating, sharing and linking of tuples across two or more (shared) CNS systems that includes assigning to a created tuple record referencing a first tuple name key (e.g., key 1) an additional field (e.g., key 2) referencing record key 1 to provide an option to search for the tuple at nodes in either or both the CNS systems using key 1 or key 2 tuple name search so that the same data can be accessed by either key 1 or key 2.

The coordination namespaces further provide an architecture that enables the adding of links between tuples to create data structures such as linked list or trees. The links provide a structure for an iterator in a distributed CNS to traverse the linked list hierarchy of tuples in the CNS or in shared CNSs. In embodiments, using linked lists, a hierarchy of tuples can span a same or different coordination namespace systems.

In an embodiment, the description makes use of and extends the Coordinated Namespace (CNS) system and methods described in commonly-owned, co-pending U.S. patent application Ser. No. 16/217,905 entitled Coordinated Namespace Processing, the whole contents and disclosure of each of which are incorporated herein by reference as if wholly set forth herein. The description further makes use of and extends the systems and methods described in commonly-owned, co-pending U.S. patent application Ser. Nos. 15/851,480 and 15/851,511, both entitled Data Shuffling With Hierarchical Tuple Spaces and incorporated by reference herein.

The following are abbreviations of terms representing entities involved in the various system and methods herein for tuple and tuple data linking operations in a CoordinationSpace (CS) or CoordinationNameSpace (CNS) system.

A Named Data Element (NDE) is a tuple record having meta data including tuple name, size, location, pointers and tuple data.

An ActualHome (AH) or Home, is a node where the named data element (tuple) is actually stored.

A NaturalHome (NH) is the node identified from the hash applied to the tuple name.

A PreferredHome (PH) can be the NH or identified from a user-specified group. The PH for csOUT identifies where to place the tuple and for a csIN where to look first for tuple.

A HashElement (HE) refers to a single (one) record per unique name in CNS, e.g., one HE for one or more tuples of the same name.

A PendingRecord (PR) is a tuple record that identifies a pending request for a tuple that has not been created.

A LocalTuple (LT) represents a metadata record and associated data at the actual home.

A RemoteTuple (RT) represents a metadata record at the NH identifying a tuple homed elsewhere.

Storage class memory (SCM) is any byte-addressable persistent memory.

A Work queue (WQ) is a hardware work queue processed by a hardware work queue manager (WQM). A tuple engine is activated by the WQM to process the tuple request in the WQ. The work queue manager, work queue and tuple engines can be implemented in a programmable core or any computing device or circuit structure running a microcoded logic circuit implementation to implement the work queue/tuple engines. Alternately, the work manager functions can be a programmable accelerator implementing these functions.

FIG. 1 depicts a schematic diagram of a multi-node computer system in which a hardware tuple creation/linking system and method of the invention are employed. FIG. 1 is particularly illustrative of an extended memory architecture 10 constructed using a node architecture of multiple processing nodes 12. At the conceptual level, this architecture enables constructing a system from "units" 15 that combine memory pools and processing capability. In an embodiment, multiple types of units 15 are possible. A node 12 may contain a single unit or multiple units 15. Examples of units 15 in a node, may include a memory service unit (Storage Class Memory Unit) 151, a Sequential Processing unit (e.g., a DRAM and CPU) 152, a Throughput Processing unit (High Bandwidth Memory and Graphic Processing Unit (GPU))) 153, and acceleration unit 154 or circuit unit 155.

In an embodiment, each of the units 15 are independent and treated as peers under the extended memory architecture 10. These units may be optimized for specific computational and memory task. The architecture depicts a collection of units where intra-node network 13 provides an efficient coherent interconnect between the units within a single node 15 and Inter-node network 20, e.g., Ethernet or Infiniband® or like network, interconnecting the computing nodes 12 within the system 10. Similar to a unit, the Inter-node Network 20 may also contain memory 18 and associated processing 19. The "external networks" identify access beyond the extended memory architecture 10.

In embodiments, methods are implemented for dynamically creating a logical grouping of units from one or more Nodes 12 to perform an application, wherein at least one of these units can run an operating system including a master process (not shown) that can setup the CNS system to run on a system of nodes. The units 15 may be, for example, a combination of general-purpose processors, special purpose processors, programmable logic devices, controllers, memory, and the like. To dynamically configure a logical group, these units need to appear to software, especially the operating system and device drivers, as if these are all part of a physically connected system within the shared memory space. To support the connected view, a system manager or management software may assign each unit within a node 12 to an application. A system manager (not shown) may schedule jobs that run over the full set of nodes in the system, start jobs (applications or workflows), and assign the resources at job launch when the required resources are available.

As described in co-pending U.S. patent application Ser. No. 16/217,905, the content and disclosure of which is incorporated by reference herein, the extended memory (EM) architecture 10 architecture for accessing memory beyond a node 12. The EM architecture includes a method for accessing memory distributed over the full or subset of the system referred to as Coordination Namespace (CNS) method. Nodes within the extended memory architecture have major characteristics: (1) Capable of being managed by a single operating system; (2) Efficient coherent load/store access to all memory pools within the node; (3) a Global Virtual Address Space for referencing memory pools inside and outside the node; and (4) access to a system wide Coordination Namespace.

As described in commonly-owned, co-pending U.S. patent application Ser. No. 16/217,905, the Coordination Namespace (CNS) is a hardware system implementing methods providing support for treating system memory or storage class memory as a key/value store with blocks of data referenced using a "name" or key.

Figure 2:
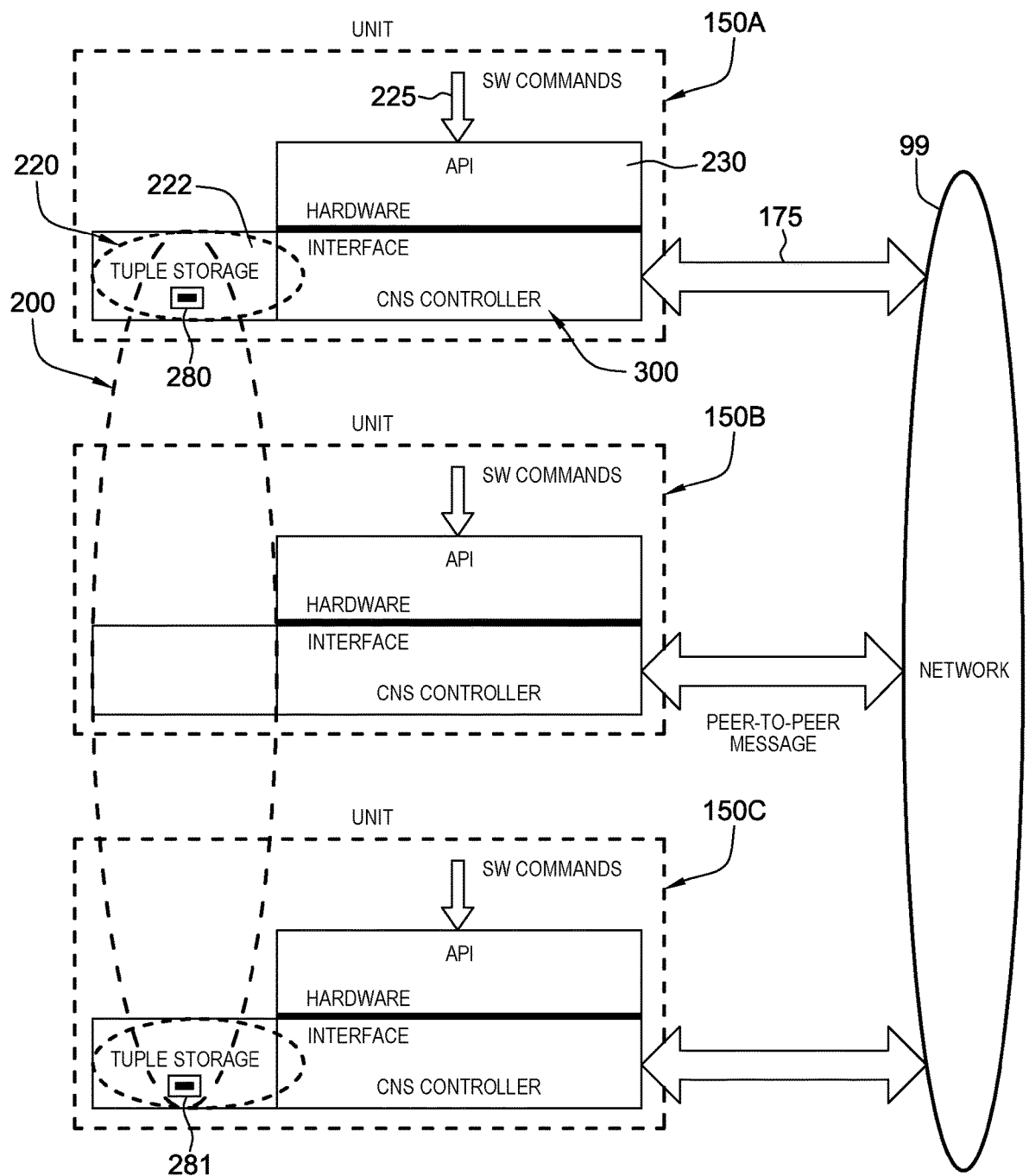
FIG. 2 shows a CNS architecture depicting networked connection of units across one or more nodes of the extended memory architecture of FIG. 1.

FIG. 2 shows a CNS architecture 100 depicting a networked connection of units 150A, 150B, 150C . . . etc. across one or more nodes of the extended memory architecture 10. In an embodiment, units 150A, 150B, 150C etc. are independent and treated as peers under the extended memory architecture. These units can be for example, any combination of processors, programmable logic, controllers, or memory optimized for a specific computational/memory task. The architecture 100 depicts a collection of units where inter-node network 20 provides an efficient coherent interconnect between the units across the system.

In an example embodiment, each unit 150A, 150B, 150C . . . etc. contains a pool of memory that is divided into one or more regions each having one of three designations: (1) Globally accessible; (2) NDE storage 220; and (3) Local 222. One embodiment of the extended memory architecture may aggregate memory regions designated as globally accessible into a Global Virtual Address Space and allocate memory regions designated as NDE storage to a distributed Coordination Namespace 200.

FIG. 2 conceptually depicts the Coordination Namespace storage system 200 distributed across units 150A, 150B, 150C . . . etc. in the extended memory architecture. Units, e.g., unit 150B, do not have to contribute to storage. Units 150A, 150B, 150C . . . etc. can access CNS 200 even if not contributing storage.

As shown in FIG. 2, the plural units distributed across nodes of the extended memory architecture include at least one hardware CNS controller 300, e.g., a programmable processor or core, that provides access to the Coordination Namespace. The CNS storage structure 200 provides an alternate view of extended memory that is separate from a processes' virtual address space local to the unit. In the Coordination Namespace, references to extended memory use a "name" for accessing a finite, ordered list of immutable values referred to as a Named Data Element (NDE) or "tuple". In an exemplary embodiment, the first field associated with every NDE is its name, a character string with an implementation dependent maximum length. The "name" references a NDE located in the Coordination Namespace. The "name" can simply be the first field, the name, a search template for any set of the fields in the NDE, and the like and referenced herein as a "name," a "key," or as a "NDE-name." The Coordination Namespace allows access to NDEs contained within a distributed object store. As shown in FIG. 2, peer-to-peer messaging over network links 175 across network 99 is used for accessing remote NDEs (tuples). In an embodiment, network 99 is a combination of the intra-node network 13 and inter-node network 20 of FIG. 1.

In embodiments, each unit contributing storage is an owner of a set of "groups" segments of the Hash of the "name". CNS storage can be located in system memory or a Storage Class Memory (SCM), or in a File System. The CNS is accessed using software commands 225 received via an application programming interface (API) 230 and forwarded to the CNS controller 300. The CNS controller is completely implemented in software if CNS storage is file system based.

The extended memory architecture uses NDEs or "tuples" within the Coordination Namespace system architecture 100 to communicate work between applications. In order to manage the Coordination Namespace, the system may also be associated with a CNS server that manages a Coordination Namespace located in a distributed manner across all or subset of the memory elements of the system. The part of the memory of the system associated with the Coordination Namespace is referred to as the Coordination Namespace memory 200. Parts of this memory may be in the nodes executing the applications, other parts may be in memory dedicated to the coordination namespace. The Coordination Namespace addresses the challenges of moving data between phases of a workflow by providing an efficient means for communication between and coordination of the applications within a workflow. In addition, the Coordination Namespace also addresses the need for keeping certain types of data persistent in memory longer than the duration of a single program or application.

In FIG. 2, one of the CNS controller elements 300 is CNS Server used for accessing the Coordination Namespace memory. The CNS server in particular manages the Coordination Namespace located in a distributed manner across all nodes (each node can have its own CNS server, CNS client, or both) of the system contributing to the distributed memory. A node may contribute all its memory to the Coordination Namespace (node is a dedicated CNS Server), parts of its memory or none of its memory. A node may still access the Coordination Namespace 200 even if not contributing any of its memory. The parts of the memory of the system associated with the Coordination Namespace may also be referred to as the Coordination Namespace memory or distributed memory. Various NDEs, such as NDE 280 and NDE 281 may be located in the distributed memory. In order to process Coordination Namespace Requests such as creating and reading NDEs a hashing of a named data element name (key) at a requesting client yields information about the node at which the named data element is located. This provides a single hop mechanism to locate an NDE.

In an embodiment, CNS Server characteristics include the use of a Hash table to manage tuples owned or naturally homed. In embodiments, a single hash table is provided per CNS node. Additionally, as multiple coordination namespaces can run concurrently on a node, there is more than one hash table per CNS node. Each unit has independent hash tables. There is further provided a Tuple memory in storage class memory and CNS data structures in a CNS Controller DDR. A CNS server uses a virtual address space local to the unit for accessing Tuples storage.

A CNS client is provisioned with request queues for locally initiated commands with one queue per process (e.g., allowing access to any open CNS).

In embodiments, example access methods provided by the extended memory architecture include, but are not limited to: (1) Direct load/store access to memory located within a node. (2) An asynchronous copy method. (3) A NDE access method. The NDE access method provides a set of commands to create, read, retrieve, and destroy NDEs in the Coordination Namespace.

When accessing the Coordination Namespace, the CNS controller (e.g., Client or Server) applies a distributed hash function on the NDE-name to locate the data and perform the data movement. A CNS Server allows access to NDEs in a distributed system in a similar way as load-store instructions in an instruction set allows access to locations in a virtual address space. Furthermore, these NDEs are located beyond an application's virtual address space. NDEs and data in the Global Virtual Address Space may persist beyond the tenure of the application.

In embodiments, each node 12 of EM 10 includes components running methods disclosed herein for implementing operations to link and share tuples generated by processes in the multi-node computing system having an extended memory defining two or more coordination namespace (CNS) systems 100.

Figure 3:
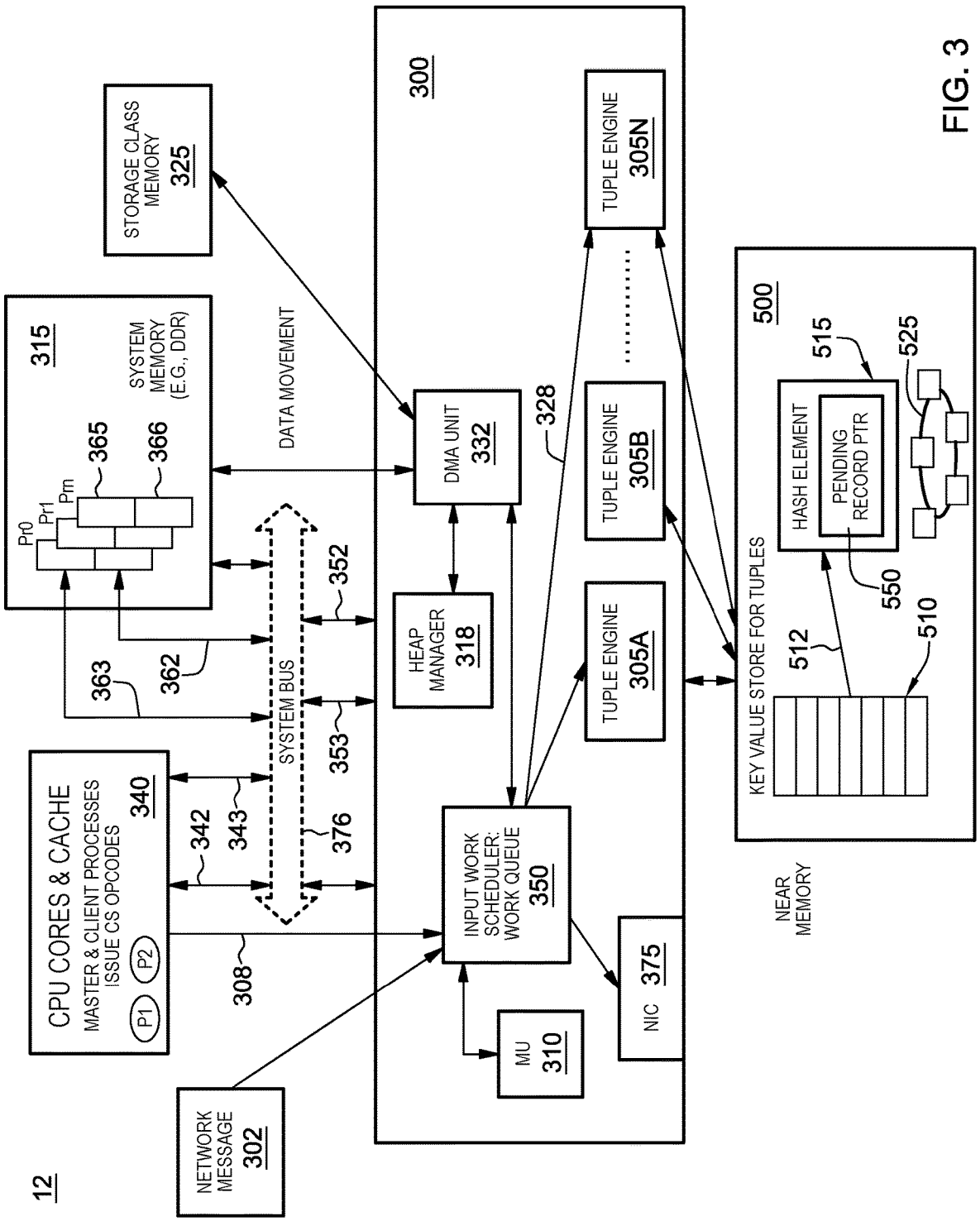
FIG. 3 schematically depicts a high-level schematic of a CNS controller for managing tuples (NDEs) in the coordinated namespace system of FIG. 2 implementing tuple linking operations.

FIG. 3 schematically depicts a high-level schematic of a CNS controller 300 at a processing node 12 for managing the linking and sharing of tuples generated by processes at nodes in the multi-node computing system having an extended memory defining two or more coordination namespace (CNS) systems. In embodiments, the controller 300 is a hardware implementation and is seen as an accelerator to process the requests offloaded by a CPU 340.

In FIG. 3, CNS controller 300 at a node 12 includes one or more tuple engines 305A, 305B, . . . , 305N which are hardware units providing the processing to perform searches for tuples or create/delete tuples as needed in a near memory structure 500 (e.g., a local DDR memory). The tuple engine performs a hash of the tuple name to locate the node designated as the natural home. In embodiments, tuple engines respond to commands issued by work manager/scheduler 350.

Each tuple engine hardware unit 305A, 305B, . . . , 305N updates local DDR data structure 510, HE, PR, LT, and RT. Further, each tuple engine: in an embodiment, is responsive to a received API request, determines whether a hash element and a tuple record associated with the specified tuple name exists and, if a tuple record exists, retrieves tuple record/data and returns the data to a requesting process 1 (e.g., process P1). A completion record is sent back to the requesting process following the data retrieval. Otherwise, it will create a new hash element for the specified tuple name and create a pending record for association with that hash element by linking the pending record to a circular doubly linked structure of local tuples. A second process 2 (e.g., process P2) running at the same node, or running at a different node, is shown in FIG. 3 that may share the tuple with process P1.

Further, each tuple engine supports pending records processing as it pertains to linking and sharing of different tuples generated by processes in a multi-node computing system having an extended memory in one or more coordination namespace (CNS) systems. That is, apart from creating/searching a hash element and/or tuple record—the tuple engine further creates and shares tuples across two (shared) CNS systems and ensures when a tuple is deleted in one CNS that reference to it, the tuple is additionally deleted in the shared CNS.

In an embodiment, near memory 500 can be a separate DRAM memory that has lower latency with respect to the tuple engines or it can be a partition within a system memory 315. The storage class memory 325 can also be another partition within system memory. A Heap manager element 318 is invoked to allocate/free memory in storage class memory.

In an embodiment, the work manager/scheduler 350 receives/processes software requests 308 (i.e., CNS opcodes) issued by CNS server and/or CNS client processes, e.g., CPU cores, and issues new work to the different Tuple processing engines 305A, 305B, . . . , 305N over a ring/bus structure or multiplexor 328. The work requests may be queued in an associated WQ (not shown).

In embodiments, near memory 500 can be a RAM (e.g., DDR3) that stores a hash table 510 that, instead of hash array element values, contain pointers, such as head pointer 512 that points to a first HE 515 and a linked list structure 525 that record the location of tuples or pending requests waiting for tuples. Such a linked list structure 525 may be pointed to by a pending record pointer 550 included in hash element

515. Tuple engines 305A, 305B, 305N traverse the hash table 510 and linked list structures 525 to search, insert or delete tuple records. By calculating the hash of a tuple name, there is provided an index into the table 510 which provides the head of the linked list (i.e. the first item in each list 525 of tuple records).

A direct memory access (DMA) memory processing unit 332 is configured to move data between the system memory and storage class memory. DMA unit 332 further enables the various CNS controller hardware components to access system memory (random-access memory) 315 and/or storage class memory 325 and enable transfer of tuple data between storage, SCM and near memory 400 or vice versa independent of any central processing unit (CPU).

A messaging unit 310 is implemented for supporting the message structure for multi-node operations to create and share tuples across two (shared) CNS systems that ensures when a tuple is deleted in one CNS that reference to it is additionally deleted in the shared CNS.

A network interface card (NIC) 375 is provided that interfaces the CNS controller unit 300 to an external network for inter-node communications.

In embodiments, work manager element 350 receives the CNS software requests (e.g., opcode) 308 from master and client processes and keeps track of processes creating and deleting the linked tuple record (meta data) that share data in a (the) CNS system(s). In an embodiment, the work manager 350 can receive request messages, e.g., tuple commands 302, over the network from other nodes relating to tuple record linking operations. The work manager 350 implements process for notifying DMA unit 332 to transfer tuple data depending on the CNS opcode being processed.

Further included as part of the system memory 315 in the CNS node architecture 12 is a request queue 365 in which local processes write a request, and a completion queue 366 which are created at the start of the coordination namespace system. A single request queue and completion queue is provided for each user process, e.g., processes labeled pr0, pr1, . . . , prn. In an embodiment, the completion queue 366 is placed consecutively after the request queue 365 array in system memory.

In an embodiment, user processes running in a CPU core 340 issues write commands to a request queue via system bus 376 providing data transfer amongst the CPU, system memory and CNS hardware controller 300. As the CNS controller hardware may not know about this new request being inserted in system memory, the process performs writing to a memory mapped IO address (MMIO address) a value—which could be the updated tail pointer of the queue that contains the request. The hardware monitors the MMIO bus and upon seeing an address belonging to it—and the corresponding value that came with the address—it compares the value with its known head pointer of the queue. If the new tail is greater than the head—then it knows that a new request has been inserted in the queue. It then proceeds to issue a load on the address corresponding to the tail pointer. If tail pointer was incremented by more than 1-then hardware loads head ptr+1, until it reaches tail of the queue. The MMIO bus carries data in packet of multiple beats. The first beat would have the address of the MMIO, and the subsequent beats have the data associated with the address.

Thus, every time a user process issues a request message 342 into the request queue 363-*a* MMIO doorbell is rung to the hardware for processing. Via messaging 353, 363 over a system bus, the CNS hardware controller 300 picks this request from the request queue 365 and processes it while the user process waits for the processing to complete. When the hardware/controller completes processing the request, it issues a completion notification message 352, 362 into this completion queue 366 for that process. The user program/processes further polls 343 via the system bus 376, this completion queue 366 for new completions. When it finds one, it clears the corresponding request from the request queue. The completion entry in the completion queue informs the user process which request got completed and some status and error messages.

Figure 4:
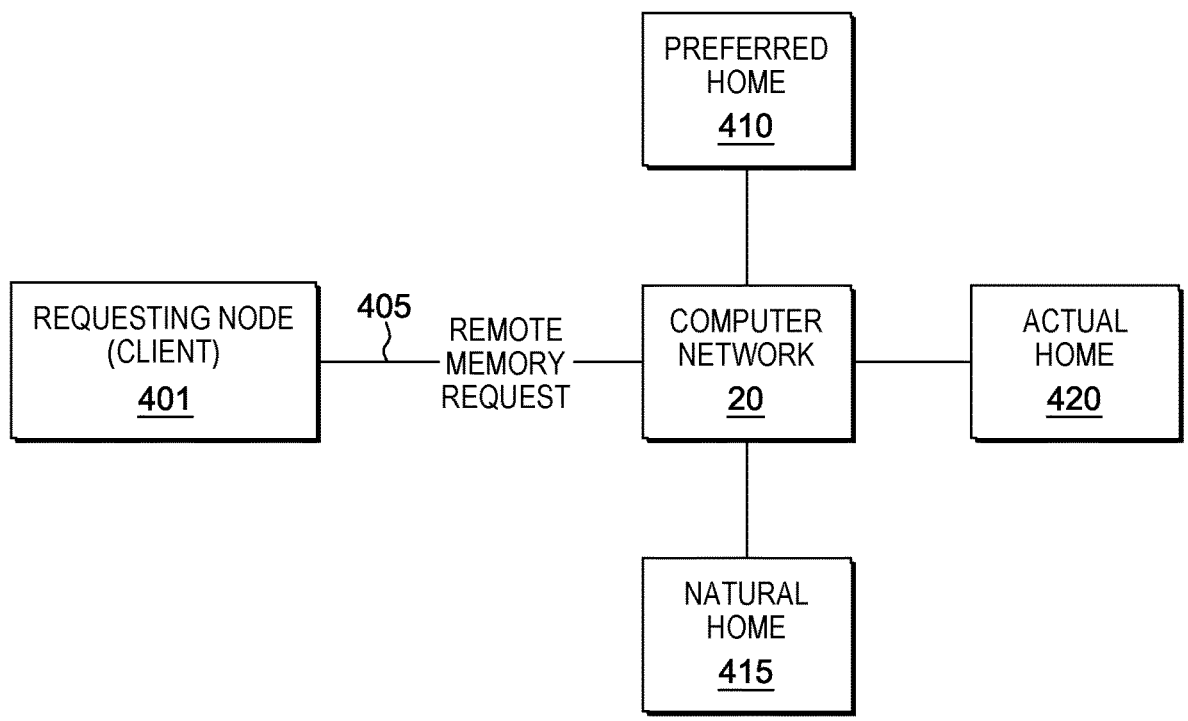
FIG. 4 shows a diagram depicting the homing of a tuple in a Coordination Namespace (CNS)

FIG. 4 shows a diagram 400 depicting the homing of a tuple in a Coordination Namespace (CNS). With respect to running a workflow or application, a requesting Node (e.g., client 401) is the location running the process making the remote memory NDE request 405, i.e., the unit 15 making the tuple command, e.g., including the tuple key or "name". At the CNS controller, the hash algorithm is applied to the tuple-name to identify the Natural Home 410. The Natural Home directly or indirectly indicates the node where the NDE is created or may be found if no other information is provided. The Preferred Home 415 may be provided by the process making the request or by a prediction algorithm, e.g. running at the CNS client, for example, by an affinity parameter. The preferred home node can be a desired location, e.g., specified by a user. When supplied, the Preferred Home 415 directly or indirectly indicates the node where the NDE should be created or where to first search for the NDE. The Actual Home 420 identifies the node where the NDE resides. When creating a NDE, the Preferred Home (node) is tried first. If the tuple cannot be created there for some reason, such as out of memory an alternate home is chosen, and that node becomes the Actual Home. When a NDE is created, the Natural Home 410 always keeps a record in the local hash table indicating the Actual Home but does not store the data. In embodiments, a PH could also be the tuple's natural home (based on the hash of the name). The Natural home node will always receive the tuple based on its key hash and make and add an entry in it. When a NDE is requested, the hash table on the Preferred Home (node) 415 is searched first. If the NDE is not found, the request is sent to the Natural Home for recording the dummy pointers for the associated key. The nodes identified by the Natural, Actual, and Preferred Homes can all be different, the same, or any combination. In addition, they can also be different or the same as the requesting node. The communication between the requesting node, the Natural Home, the Preferred Home, and the Actual Home is performed via a the inter-node Network 20.

Figure 5:
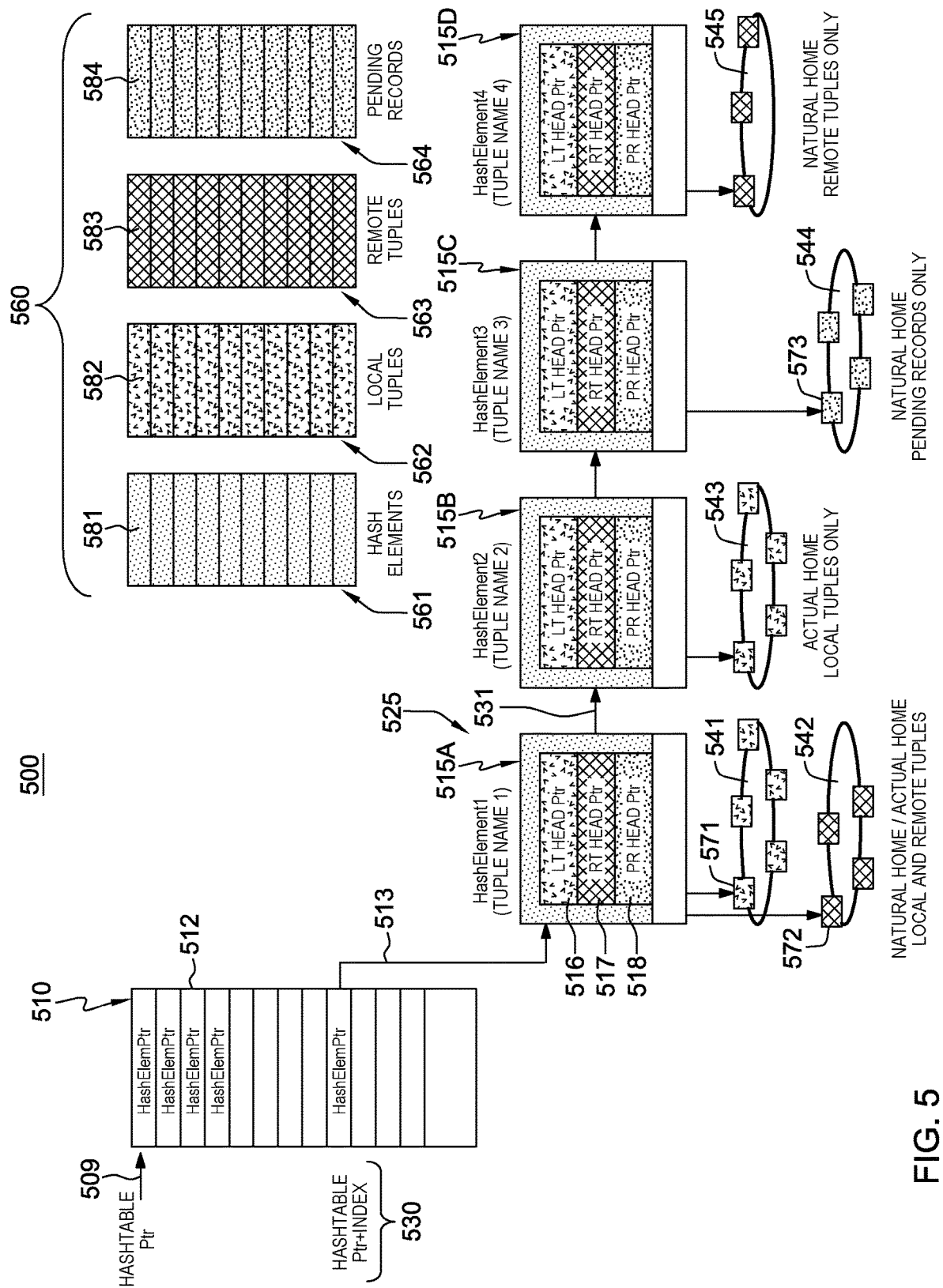
FIG. 5 depicts in greater detail the DDR hash structures in a near, or a partition in system memory implemented in CNS memory at a distributed node.

FIG. 5 depicts an implementation of a DDR hash structure(s) in a near memory 500 (e.g. dynamic RAM (DRAM) memory or double data rate RAM (DDR)) or a partition in system memory, used for hardware and software support for sharing and interlinking tuples for a CNS system architecture. The embodiments depicted in FIGS. 5-9 herein are operations applicable at nodes of each CNS system, e.g., CNS0, CNS1, . . . , CNSN. In embodiments, the near memory 500 includes a local or near memory accessed by nodes 12 of the CNS extended memory architecture.

As shown in FIG. 5 a unit 500 provides the hash table 510 in the dynamic RAM (DRAM) memory or a DDR memory, with the hash table 510 containing fixed size structures in the form of a hash table map including hash element pointer entries 512 that point to a corresponding linked list array structure 525 maintaining a linked list of pointers to various types of tuples (e.g., LT, RT and PR) stored at memory locations in the CNS extended memory. In particular, a tuple pointer (HashElemPtr) 512 points to a head pointer of the linked list 525.

In an embodiment, the hash table 510 is initially accessed by a pointer 509 based on a part of the hash value of a tuple name of a received sorting operation tuple command. The hash table map data structure 510 implements a hash function to further compute from the hash value of the tuple name a pointer index 530 for accessing a particular memory pointer element in the table 510 of memory pointers. The hash element contains the key of a tuple key-value pair. While multiple tuple keys or "names" can hash to a same index, they are linked as a linked list 525 of hash elements 515 in a linked list structure 525.

For example, as shown in FIG. 5, a HashElemPtr memory pointer 513 points to a first hash memory element, i.e., a first element 515A of a linked list 525 of tuple storage locations in memory 500 which can be used for memory read or write operations in the CNS extended memory. That is, instead of each hash array element values, each item in the hash table map data structure 510 is simply the head pointer 513 to a first hash element item in a linked list 525. By calculating the hash of the received tuple name, there is provided an index 530 into the array table—which in provides the head 513 of the linked list (i.e. the first item in linked list 525).

In embodiments, each hash element 515 in that linked list 525 would correspond to a unique tuple name, and it is possible to have multiple tuples for the same name, i.e., each hash element 515 is searched to find a tuple name (1 per hash element) and within each hash element 515 is three lists: list of local tuples (actually stored on that node), a list of remote tuples (if the node is NH for that name, a list of tuples that are known that exist somewhere else), and in an event that a request for the tuple came before the data is actually provided, e.g., by receiving an CNS "IN" opcode prior to receiving an CNS "OUT" opcode, the request is saved in a pending record. Each linked list 525 is a linked list of hash elements, with each hash element 515 including one or more of: a pointer 516 to connect to the local tuple(s) list, a pointer 517 to connect to a respective linked list structure of remote tuple(s), and/or a pointer 518 to connect to a respective linked list structure of pending record(s) all for the same tuple name, as well as a next pointer 531 to a following hash element 515 in that linked list 525. Linked list 525 includes tuples that hash to the same Hash Table index where each element in the list corresponds to a unique tuple name.

Each of the local tuples/remote tuples/pending records connected to the given hash element 515 are connected themselves as linked structures. These linked structures may be circular and doubly-linked. Thus, as shown in FIG. 5, there are three (3) possible combination of allocation of tuple records in memory 500 as circular doubly linked structures pointed to by a hash element tuple name including: 1) a circular doubly linked list structure 541 of local tuples for a given unique name stored in memory allocated on the node (including NH and AH tuples) as pointed to by hash element 515A; 2) a circular doubly linked list structure 542 of remote tuples for a given unique name that are NH on the node and pointed to by hash element 515A, but the data is actually stored on a different node; and 3) a circular doubly linked list structure 544 of pending requests for NH tuples of a given unique name that have not been created (e.g., only pending records present for a given tuple— indicated for the natural home as pending records (PR) cannot be present in actual homes). As shown in FIG. 5, a circular doubly linked structure 543 is formed with only local tuples present—indicating for actual home local tuples only as pointed to by pointer in hash element 515. Further, a circular doubly linked list structure 545 of only remote tuples if only remote tuple list is present for a given tuple name—its the natural home for that tuple, as pointed to by pointer in hash element 515D. In additional embodiments, a combination such as a NH=AH can exist such that both LT list and RT list would be maintained in the same node (e.g., both the natural home and actual home for the tuple), e.g., as pointed to by pointers in hash element 515A.

Thus, as further shown in FIG. 5, the LT head pointer 516 of hashelement1 515A associated with a first tuple name points to a head 571 of double-linked circular list structure 541 of local tuples and the RT head pointer 517 of hashelement1 515A associated with a first tuple name can point to a head 572 of double-linked circular list structure 542 of remote tuples. Similarly, the PR head pointer 518 of hashelement1 515C associated with a third tuple name points to a head element 573 of double-linked circular list structure 544 of pending records. It is understood that a head tuple of the pointers can represent a new hash element taken from free pointer list memory buffers 560 to record a first open tuple element for that name responsive to a CSOut( ) tuple command without a corresponding entry in hash table 510. When the hash table is searched, and a hash element is already found for the processed tuple name, then the linked list structure is formed by appending a new record for commands received for that same tuple name.

In an embodiment, as shown in FIG. 5, at a node, the data value part of the tuple is stored in near memory and are pointed to by a data pointer field in the created tuple record. The local tuples themselves are pointed to by a pointer as indexed in the hash element corresponding to the tuple name in the CNS structure at a node shown in FIG. 5. Using a local DRAM memory, there is locally stored tuple values. If data size is small, e.g., on the order of 64 bits, performance is improved by storing this tuple value data locally within the local tuple itself in the form of immediate data.

Further, as shown in FIG. 5, there are corresponding four (4) types of free list memory buffers 560—one for each type that is needed to form these linked list structures 541, 542, and 544 and one for the linked list of hash element 525 where a hash element is for each unique name that hashes to a hash table index. In an embodiment, a tuple engine traverses the hash table based on a received tuple name and accesses the linked list structures to search, insert or delete tuple records. When a tuple engine needs to create an entry in these linked structures—the tuple engine retrieves a new element from the free list 560 corresponding to the linked structure type. As shown in FIG. 5, a tuple engine can pick an entry for a linked list structure from free lists associated with hash element type 561, local tuples type 562, remote tuples type 563 and pending records type 564.

In embodiments, fields for the linked list associated with hash element type 561 include a head of linked lists for local, remote and pending tuple records. In an embodiment, the CNS controller contains a head pointer for each free list type: hash element, local tuple, remote tuple, and pending records. Each element in the free list include a set of pointers linking together the free elements. For example, free list element 581 associated with hash element type 561 include: a set of pointers, e.g., a pointer to an address of next HashElem, a pointer to an address of a previous HashElem, a pointer to an address of a HashTable parent (i.e., the hash index), and head pointers for each type of tuple record linked list, e.g., pointer to an address of a first element in PendingReq list (pending request), pointer to an address of a first element in LocalTuple list, and pointer to an address of a first element in RemoteTuple list of that tuple name, etc. When a tuple engine needs a new hash element for an NDE, it removes the first free hash element 581 and adds the element to the linked list 525. The tuple engine then removes the first free tuple record type required (e.g., 582, 583, 584) and fills in associated pointer in the new hash element, e.g., 515A, thus creating a tuple record for the new NDE.

Further, the fields 582 in free lists associated with Local Tuples type 562 include information for creating the linked list. For example, for LT linked list 541: fields include a pointer to a tuple address in SCM, a pointer to an address of the next LocalTuple, a pointer to an address of a previous LocalTuple, a pointer to an address of a HashElem parent, etc. Additional information is provided including information needed to recreate the pending request for the tuple when the tuple is created, e.g., an address of actual tuple, a size of the actual tuple, and a pointer to an address of the NH RemoteTuple.

Further, the fields 583 in free lists associated with Remote Tuples type 563 include information for creating the linked list. For example, for RT linked list 542: fields include a pointer to details of actual home of tuple and location of tuple record in home hash table structure including: address of the next RemoteTuple, an address of a previous RemoteTuple, an address of a HashElem parent, an actual home unit of tuple, and an address of LocalTuple at home.

Further, the fields 584 in free lists associated with Pending Records type 564 include information to recreate the original request into a work queue including: address of the next PendingReq, an address of previous PendingReq, an address of HashElem parent, etc. Additional information is provided including information needed to recreate the pending request for the tuple when the tuple is created including: a Requesting unit, a Requesting pid (process identifier) to facilitate memory address translations between effective address to real/physical addresses, a Requesting address, a Requesting size, a Requesting queue tag and a Request type (RD/IN).

Although not depicted, in a further embodiment, CNS controllers send commands between controllers when processing a tuple request.

For example, Coordination Namespace APIs are provided with one coordination namespace access API including: csOut( ) which is a command sent from a requesting unit to a NH or PH to take the tuple from requestor and store it, i.e., create it, in the CNS. A csIn( ) API request is a command sent from a requesting unit to a NH or PH to retrieve the tuple from CNS and store it in the requestor node (i.e., and removing the tuple from CNS).

For a tuple read, the coordination namespace API is structured as csRd (cs,tuplename,group,returntag) where "cs" is coordination namespace handle, "group" identifies the unit/node where the user suggests to look for the tuple first, and the "returntag" parameter enables identifying the request when a response is sent back by the CNS controller to the process.

To illustrate the general processing of a csOut( ) API, when a requesting node 401 issues a software API "csOut ( )" (hardware opcode=csout), the process at the node is requesting creation of a new tuple in the CNS, e.g., taking the tuple from request to store in CNS system 200 as described as follows:

The processing of the general csOut( ) command message to create a tuple for storage at a node include steps of: receiving, at a node from a requesting node, a User Req csOut, and in response, checking at the workload scheduler whether the node is the preferred home for the tuple, e.g., check if node=preferred home. If the node receiving the csOut( ) command is not the preferred home, then the messaging unit sends the csOut( ) message to the preferred home for processing that tuple. If the node receiving the csOut( ) command is the preferred home, then the tuple engine at the node will check the hash of the tuple name and compute a hash entry address. Further the tuple engine at the receiving node issues a Read head pointer in the Hash table and searches or scans any associated hash element linked list structure for the corresponding entry in the DDR memory 500 to determine whether a tuple had been created for that tuple name.

The tuple engine will further check the response received from the DDR memory on board the unit 500, or alternatively, the system memory or any near memory which is faster/lower latency than the storage class memory, compute a next address of hash element and issue a Read hash element. Further, the tuple engine will check the DDR response, check the tuple name in hash element; and determine whether the tuple name matches the request. This process of computing next hash element address, reading the hash element and determining whether the tuple name has been created in a hash element is repeated continuously until reaching the end of the linked list structure.

That is, as long as the tuple name of hash element linked list structures does not match the request, then the tuple engine will obtain the head of local tuple list and issue a DDR read request for first local tuple. Then, the tuple engine gets the next pointer of retrieved tuple, and issues a DDR read request for next local tuple in list. The process of reading from the DDR is repeated until the last element of the linked list is read.

If, while traversing the linked list structure, it is determined that no tuple (hash element) has been created to match the tuple name requested, a new hash element is retrieved from the free pointer list and it is inserted into the list and a first record of the tuple name is created as a tuple hash element. The tuple engine will then obtain a free element for a local tuple record, update the local tuple head pointer with the newly obtained free element, and update the new tuple record with the address location of data in the SCM. The tuple engine then completes processing, notifies the work scheduler/user of the completion and notifies the Natural Home of new record.

Upon scanning by the tuple engine, if a tuple hash element has already been created for the received tuple name in the linked list indicated in the csOut( ) request, then a new record is created in the associated linked list structure for that hash element.

In embodiments, the requesting node can issue a software API "csIn" (hardware opcode=csin) which is invoked to retrieve and remove a matching tuple from CNS. In CNS processing of the general csIn( ) command at a node can include steps of: receiving, at a node, a User Req csIn, and in response, checking at the workload scheduler whether the node is the preferred home for the tuple, e.g., check if node=preferred home. If the node receiving the csIn( ) command is not the preferred home, then the messaging unit sends the message to the preferred home for processing thereat. If the node receiving the csIn( ) command is the preferred home, then the tuple engine at the node will check the hash of the tuple and compute a hash entry address. Further the tuple engine at the receiving node issues a Read head pointer in the Hash table and search for the corresponding entry in DDR memory. In an embodiment, if the tuple record is not found in preferred home, then this request gets sent to the natural home where address information on the tuple record will be found if the tuple exists. This might be in the form of a remote tuple record that informs where the actual home is for the tuple. If not found, it becomes a pending request record.

The tuple engine will further check the response received from a memory controller of the DDR memory, compute a next address of hash element and issue a Read hash element. Further, the tuple engine will check the DDR response, check the tuple name in hash element; and determine whether the tuple name matches the request.

If the tuple name does not match the request, then the tuple engine will continue to search the linked list for a matching tuple.

If the tuple name does match the request, then the tuple engine will obtain the head of local tuple list and issue a DDR read request for first local tuple. Then, the tuple engine performs removing the element from linked list, updating the hash element to point to next element in list, and delete the Hash element if it was last element.

The tuple engine then informs a local memory using a direct memory access (DMA) request, to transfer data from the SCM to the local memory. Then a command is issued to update the natural home in response to the removing the tuple. Then, the tuple engine completes processing and notifies work scheduler/user of the completion.

The extended memory architecture 10 of FIG. 1 provides a hardware and software accelerated mechanism to support operations for creating, linking and deleting tuples owned by one or more operating processes in a distributed multi-node, multi-process computing environment implementing one or more independent CNS extended memory systems.

Figure 6:
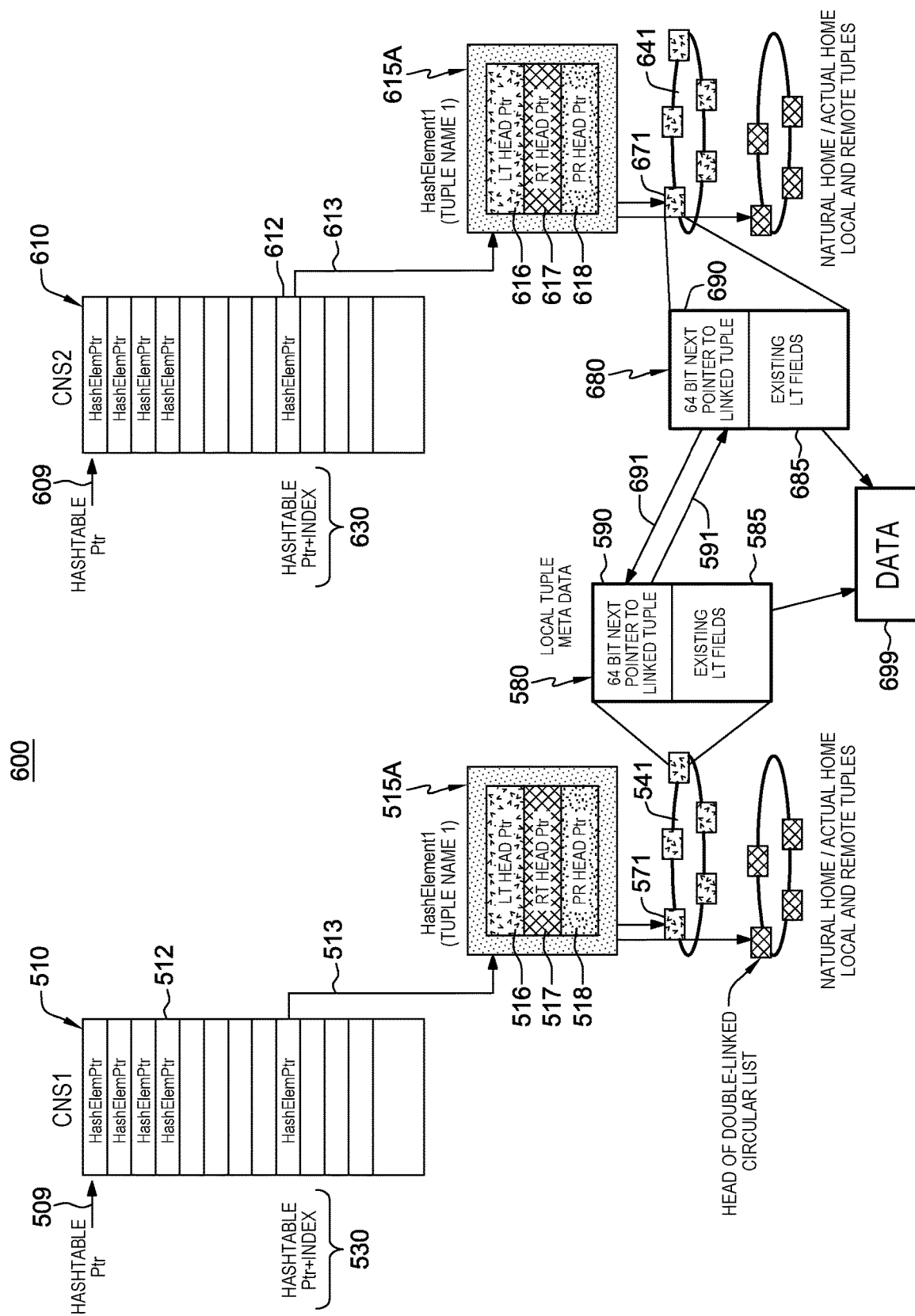
FIG. 6 depicts in greater detail the DDR hash structures in a near, or a partition in a system memory illustrating the linking of tuples in a distributed computing system implementing one or more CNS systems in an embodiment.

As shown in FIG. 6, the CNS extended memory architecture provides hardware support system 600 for a distributed memory system for efficiently interlinking tuples so that they are shared amongst multiple independent CNS systems, e.g., at least a CNS1 at a node having hash table 510 and a CNS2 at a node having hash table 610, each CNS system spanning multiple units/nodes. Each CNS provides for a method of communicating between CNS controllers that does not require a communication stack such as MPI (message passing interface standard) implementation. Similar to the tuple memory storage of a first CNS system CNS1 500 of FIG. 5, a second independent CNS system (CNS2) includes, at a node, hash table map 610 of memory pointers 612 pointed to by a pointer 609. Based on a whole or part of the hash value created by a hash function of a tuple name of a received tuple command a pointer index 630 into the hash table map data structure 610 corresponding to the tuple name for accessing a particular memory pointer element 612 in the table 610 of memory pointers. Memory pointer 612 points to the hash element 615A that contains the key of a tuple key-value pair. In embodiments, multiple tuple keys or "names" can hash to a same index and are linked as a linked list of hash elements such as hash element 615A in a linked list structure.

In an embodiment shown in FIG. 6, the CNS1 hash element 515A is a hash element corresponding to a unique tuple name, e.g., tuple name 1, and in the second CNS system, CNS2, is hash element 615A also associated with tuple name 1 as it is possible to have multiple tuples for the same name. Within each hash element, e.g., in the hash element 615A are three lists: a list of local tuples (actually stored on that node), a list of remote tuples (the node is a NH for that name but the data is actually homed by a different node), and a list of pending tuples request received for tuples that do not yet exist in the CNS. In an event that a request for the tuple comes before the data is actually provided, e.g., by receiving an CNS "IN" opcode prior to receiving an CNS "OUT" opcode, the request is saved in a pending record. As in the first CNS, e.g., CNS1 of FIG. 5, included within hash element 615A of CNS2 are one or more of: a pointer 616 to connect to a first record of the linked list of local tuples, a pointer 617 to connect to a first record of the linked list of remote tuples, and/or a pointer 618 to connect to a first record of the linked list of tuple pending records, all for the same tuple name, e.g., tuple name 1. As further shown in FIG. 6, the LT head pointer 616 of hashelement1 615A associated with a first tuple name points to a head 671 of double-linked circular list structure 641 of local tuples.

As shown in the system 600 of FIG. 6, in support of operations for interlinking tuples amongst two or more independent CNS systems having at a node in CNS1 a hash table 510 and at a node in CNS2, a hash table 610, a CNS controller at the node(s) generates a local tuple record (meta data) 580 for a tuple name, e.g., tuple name 1, that points to a data element 699 stored in the system. Similarly, for the same tuple name, e.g., tuple name 1, the CNS controller at an associated node in the second CNS system also generates a local tuple record (meta data) 680 for that tuple name that also includes a pointer address pointing to the same data 699 or a different data at a different address location. In an embodiment, the local tuple record 580 associated with double-linked circular list structure 541 of local tuples in the first CNS system is linked (via a virtual link key) to the local tuple record 680 of the double-linked circular list structure 641 of local tuples associated with second CNS system.

In a coordination namespace system, the processes belonging to a Coordination namespace can access only tuples belonging to that namespace. In the embodiment shown in FIG. 6, to provide for a union or intersection among multiple CNS systems where tuple data may be accessed by processes belonging to either of the two Coordination namespaces, the CNS controller tuple engine generates the local tuple record 580 to store existing local tuple metadata 585 including a local tuple field (address) pointing to data 699 stored in associated near memory in addition to generating a virtual link key, i.e., a "next" linked tuple pointer 590, e.g., a 64 bit pointer, in the actual tuple record 580 that points to an address of the local tuple record at the second CNS system, e.g., local tuple record 680. The pointer 590 is depicted as linking (591) the tuple record 580 of CNS1 to tuple record 680 of CNS2 associated with tuple name 1. Similarly, the CNS controller tuple engine generates the local tuple record 680 at the CNS2 system to store existing local tuple metadata 685 that includes a local tuple field pointing to the same stored data 699 in near memory in addition to generating a virtual link key, i.e., a "next" linked tuple pointer 690, e.g., a 64 bit pointer, in the actual tuple record 680 that points to the local tuple record 580 at the first CNS system. The pointer 690 is depicted as linking 691 the tuple record 680 of CNS2 to tuple record 580 of CNS1 associated with tuple name 1.

In an embodiment, to link tuples in different coordinated namespace architecture systems, the CNS controller at a same or different node in the respective independent CNS1, CNS2 systems creates the respective records 580, 680 responsive to a csOUT( ) application programming interface (API) command or request that specifies the CNS systems, the tuple name(s), and any associated parameters. In an embodiment, a csOUT( ) API command that configures the CNS controller to accomplish this is in a form:

csOUT(cs1, cs2, key1, key2, data).

where cs1 is the first CNS system, cs2 is a second CNS system, key1 is the tuple name associated with the key of the first tuple record 580 created by the tuple engine, key2 is the tuple name associated with the key of the second tuple record 680 and both having fields 585, 685 pointing to the same data (the "data" field is the stored data 699 associated with the tuples). In this embodiment, the key1 and key2 fields are the same, i.e., associated with tuple name "tuple name 1" in the embodiment depicted in FIG. 6. Each "next" linked tuple pointer 590 of the tuple record 580 in CNS1 and "next" linked tuple pointer 690 of the tuple record 680 in CNS2 point to the each other and constitute bi-direction links 591, 691 responsive to this csOUT( ) request.

In an embodiment, a set of processes request to create a key-value tuple(s) in CNS 1 interlinked with tuples created by another set of processes in a CNS 2 and a third set of processes can access the already created/linked tuples in both these CNS1 and CNS2 namespace systems or only the common set of tuples of these CNSs. That is, a third set of processes that need to access this intersection of tuples between CNS1 and CNS2 can attach to one of the two coordination namespace and access the linked tuples. The process can read tuples that have a next link pointer going into the other CNS and if such a link exists—it knows that it is reading the intersection of tuples present in the two coordination namespaces. To access a union of tuples of the two CNS1 and CNS2, the third set of processes would attach to both the Coordination namespaces CNS1 and CNS2. The csOUT( ) API configures the CNS controller 300 to create tuples being part of two CNSs and by generating tuple pointers 590, 690 that point to the same data location to share the data without duplicating data in storage class memory. When tuples are shared across CNSs-a deletion of a tuple in one CNS requires that reference to it is deleted in the shared CNS in addition.

Figure 7:
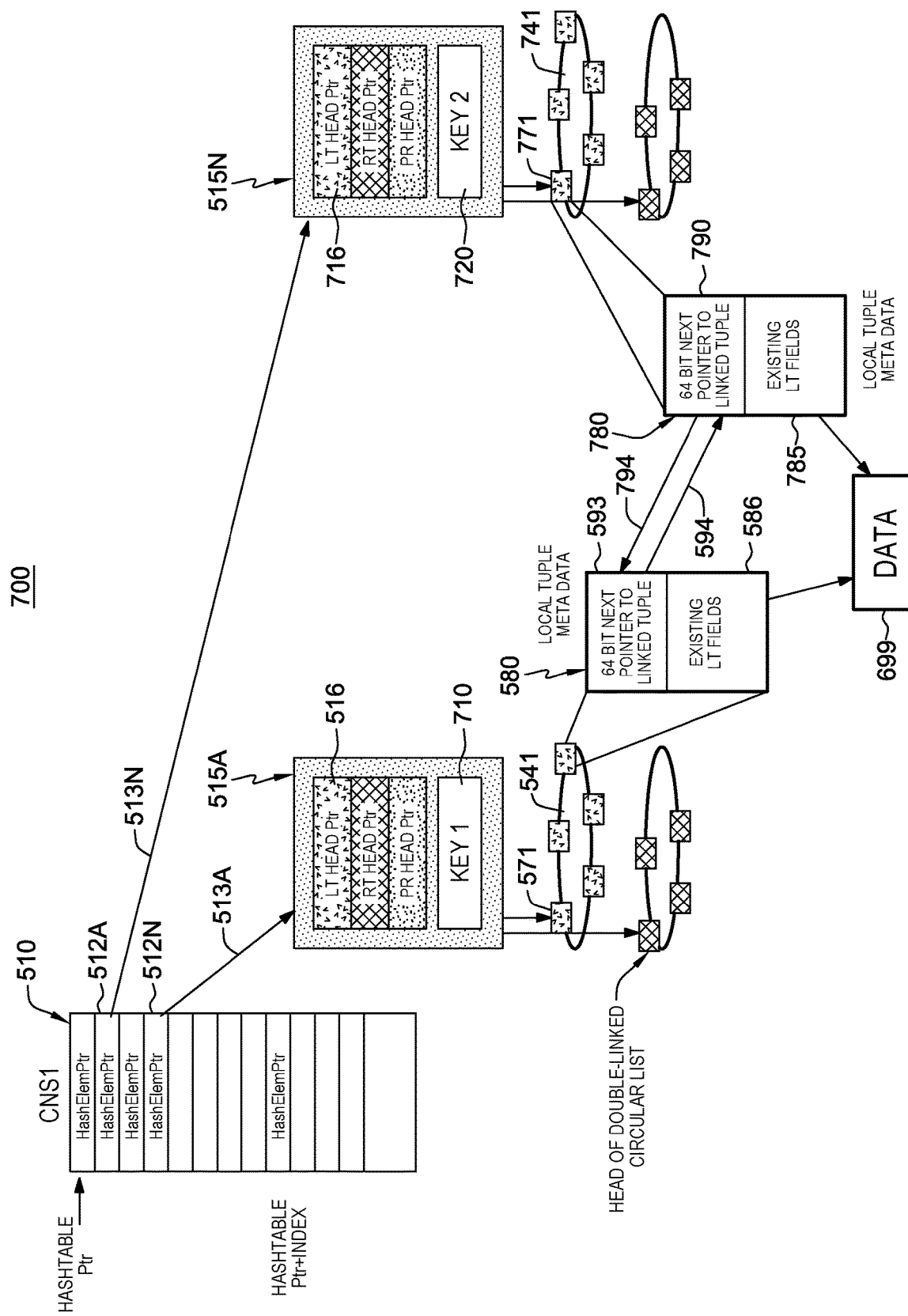
FIG. 7 depicts a status of an example CNS system in which a first Named Data element created for a first tuple name is linked to a second NDE created for a second tuple name and in which the associated data is shared among the NDEs.

FIG. 7 depicts a status of an example CNS system 700 in which a first Named Data element has been created for a first tuple name, "Key 1" and associated data and in which a second NDE has been created for a second tuple name, "Key 2" and associated data which is linked to the tuple record of the first named data element. That is, in an embodiment, a link in the first named data element is created to a tuple record of the second named data element such that a referencing of the first NDE gives associated data as well as a link to the associated second NDE and second NDE gives reference to associated data as well as a link to the first NDE. In such multi-key configuration, tuple data can be retrieved in more than one way using the virtual link key, and tuples can be searched by either Key 1 or Key 2.

As shown in FIG. 7, the CNS extended memory architecture provides hardware support system 700 for efficiently interlinking metadata associated with two independent tuples within the same CNS system, e.g., CNS1. For example, as shown in FIG. 7, a node at a CNS system (e.g., CNS1) includes a hash table map 510, a first hash element memory pointer 512A associated with a first tuple name, e.g., "Key 1", pointing at 513A to an associated hash element 515A for accessing local tuple metadata record 580 stored at the doubly-linked local tuple storage structure 541 pointed to by LT head pointer 516 associated with that first tuple name. Likewise, the hash table map 510 of CNS1 includes a second hash element memory pointer 512N associated with a second tuple name, e.g., "Key 2", pointing at 513N to a further hash element 515N for accessing local tuple metadata record 771 stored at the doubly-linked local tuple storage structure 741 pointed to by LT head pointer 716 associated with that "second" tuple name in the second hash element 515N.

In the embodiment shown in FIG. 7, to provide for a multi-key tuple among multiple tuple hash elements in a single CNS system, the local tuple record 580 associated with tuple name "Key 1" stores existing local tuple metadata including a local tuple fields 586 pointing to data 699 stored in associated near memory in addition to a virtual "next" linked tuple pointer 593, e.g., a 64 bit pointer, on the actual tuple record 580 that points to the local tuple record, e.g., local tuple record 780, created for and associated with the tuple name "Key 2". The pointer 593 for tuple record 580 for tuple name "Key 1" is depicted as linking (594) the tuple record 580 to the tuple record 780 associated with tuple name "Key 2" both in the same CNS system. Similarly, the local tuple record 780 stores existing local tuple metadata including a local tuple field 785 pointing to the same data 699 stored in that node's associated near memory in addition to a virtual "next" linked tuple pointer 790, e.g., a 64 bit pointer, on the actual tuple record 780 that points to the local tuple record 580. The pointer 790 is depicted as linking 794 the tuple record 780 for tuple name "Key 2" to tuple record 580 for tuple name "Key 1" in the same CNS system, e.g., CNS1. Links 594, 794 form a bi-directionally linked tuples.

Figure 8:
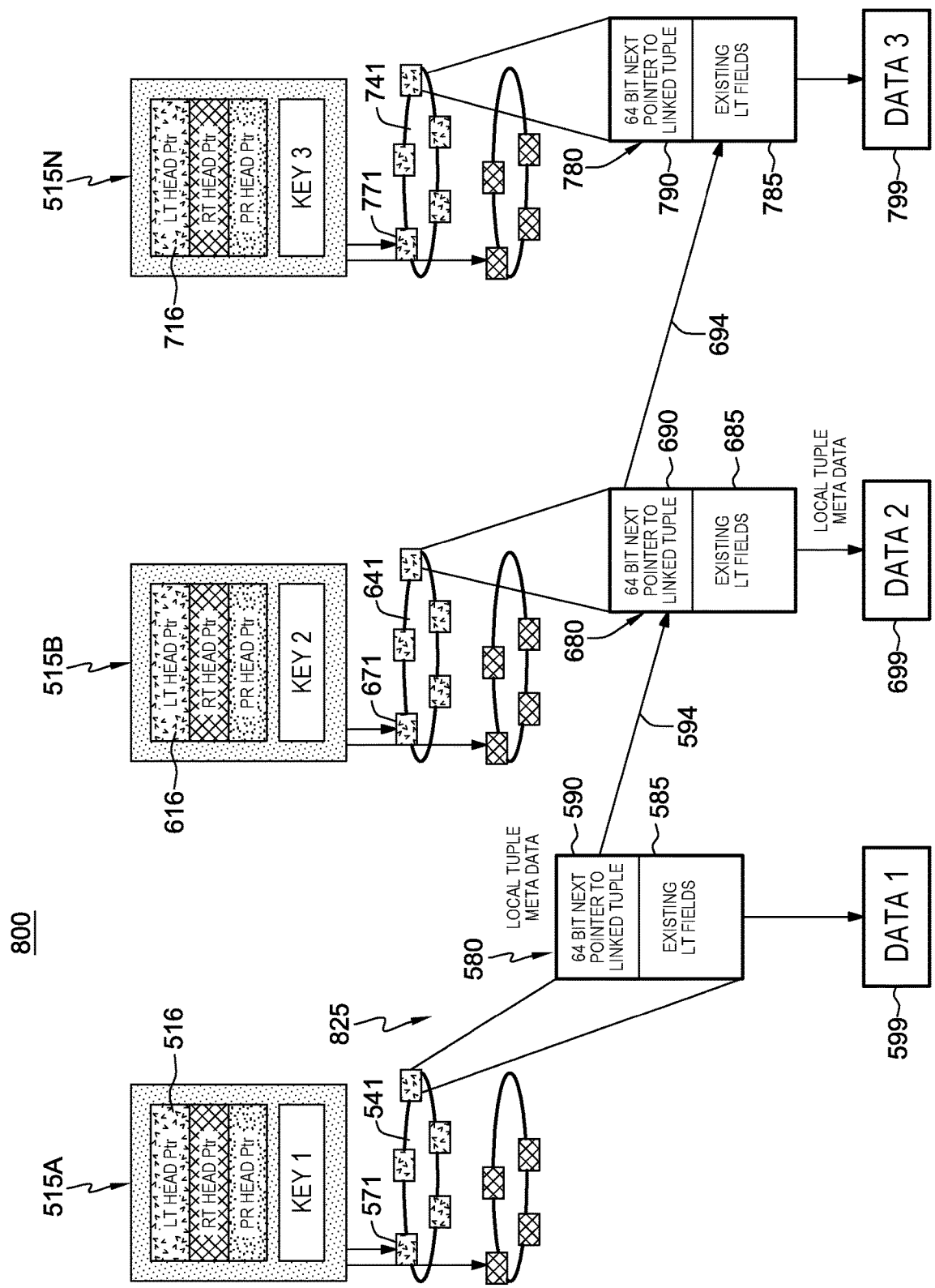
FIG. 8 depicts a status of an example CNS system in which there is generated a linked list of NDEs (tuple records) at the request of a process running at a single node, or processes across multiple nodes of a single CNS system or multiple CNS systems.

FIG. 8 depicts a status of a CNS system 800 in which there is generated an example linked list 825 of NDEs (tuples). In an embodiment, the CNS controller at a node generates a linked list of tuple records at the request of processes running at single node, or processes running on multiple nodes of a single CNS system or across multiple CNS systems. In an embodiment, a sequence of instructions is implemented that involve a repeated series of memory access patterns in which the accessed meta data at each tuple record determines the subsequent pointer address to the next successive tuple record to be accessed, forming a serially-dependent chain of linked tuples, i.e., a chain of tuple data/metadata loads. In an embodiment, this pointer chasing feature is used to link tuples using a multi-key command API.

In the embodiment shown in FIG. 8, a user process can perform an iterator method for creating and/or accessing a linked list structure of NDE, e.g. tuple records. The CNS controller at a node of the CNS system 800 can perform the iteration by reading through the tuple meta data that are linked to form the serially-dependent linked list. In FIG. 8, an example linked list structure 825 generated by a CNS controller at one or more nodes includes hash elements 515A, 515B, 515N associated with different tuple names, e.g., Key 1, Key 2 and Key3. Each respective hash element 515A, 515B, 515N includes a respective LT pointer element 516, 616, 716 each pointing to a respective first element 571, 671 and 771 of a respective circular doubly linked list 541, 641, 741 of local tuple records. At each linked list structure 541, 641, 741 associated with hash elements 515A, 515B, 515N, corresponding to different tuple keys, e.g., Key 1, Key 2 and Key3, is a respective tuple record 580, 680, 780 stored in near memory. Each respective tuple record 580, 680 and 780 have respective local LT metadata fields 585, 685 and 785 with respective pointers pointing to memory addresses of respective data 599, 699, 799 stored in near memory. Each respective stored data 599, 699, 799 can be different values.

In embodiments, each tuple record 580, 680, 780 is generated by the CNS controller at a respective node to include a respective pointer to a "next" tuple of the linked list 825. For example, a first tuple record 580 corresponding to tuple name Key 1 includes a "next" pointer 590 creating a link 594 to a second tuple record 680 corresponding to tuple name Key 2 of the linked list. The second tuple record 680 of the linked list includes a "next" pointer 690 creating a link 694 to a third tuple record 780 corresponding to tuple name Key 3. The third tuple record 680 of the linked list includes a "next" pointer 790 creating a link to a further tuple record of a same or different CNS system. In this embodiment, the "next" pointer 590, 690, 790 is the metadata that allows an iterator to iterate through the sequentially-dependent list of tuples, or as a multi-key or for operations used in setting-up of a linked tuple records forming a tree. For example, using successive "next" pointers in a linked list 825 of tuple records, each tuple record of the linked-list structure can be iteratively accessed, i.e., provides an iteration through a linked list structure. For example, a certain entity, e.g., a grade-school class, includes a list of entities, e.g., students, and CNS system 800 creates for that school class (entity) a linked list of records for respective tuple names (e.g., Key names) corresponding to the students belong in the class. A single node 12 in the distributed memory system invokes the iterator to access the first element (e.g., corresponding to the first student of the class) of the linked list of tuples, e.g., tuple record 590 and use the next pointer to access the next student associated with that class, with the process using each successive "next" pointer to access and to retrieve the data associated with each student, e.g., Data1, Data2 and Data3 in FIG. 8 until all sequentially-dependent linked keys have been processed.

Figure 9:
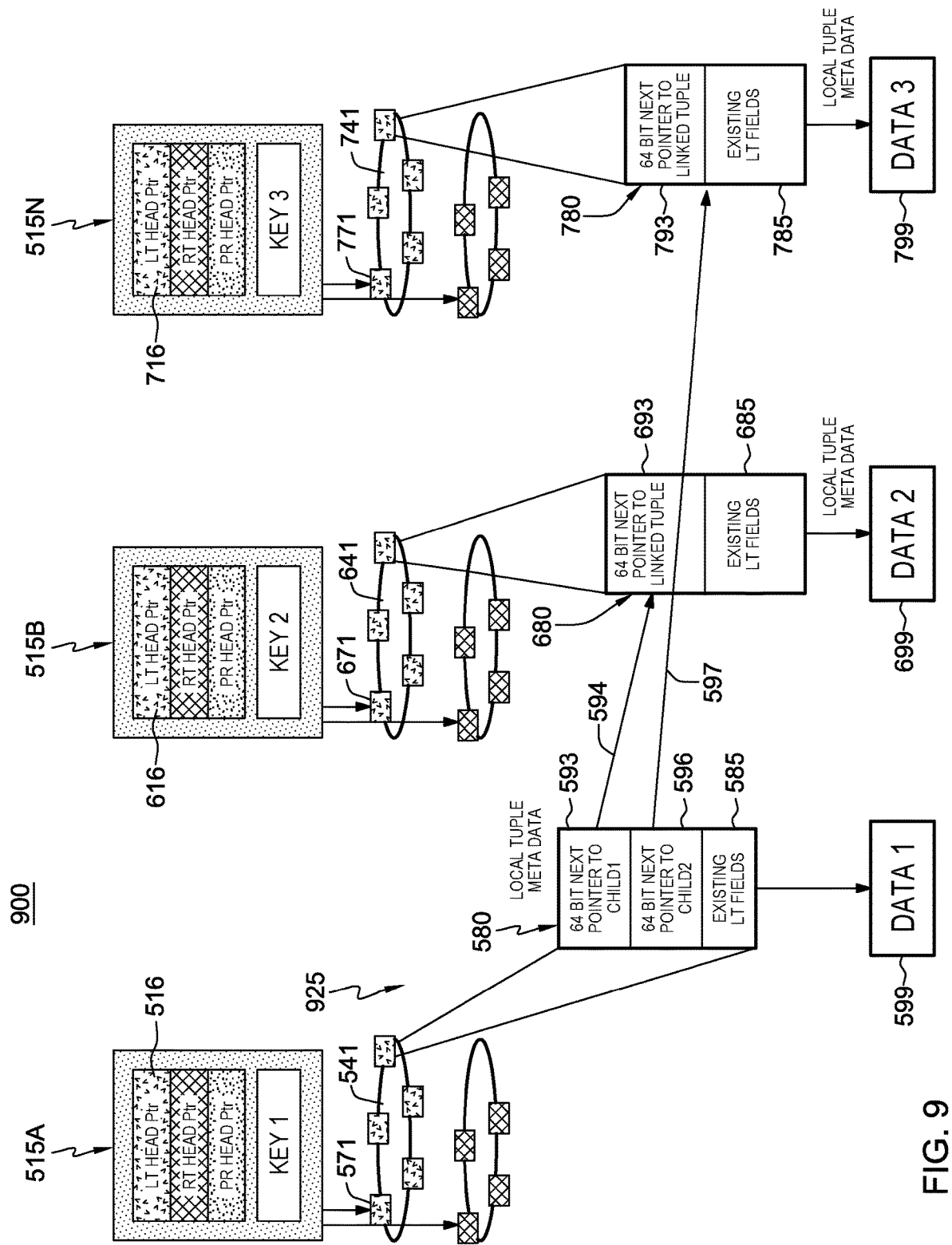
FIG. 9 depicts a status of an example CNS system in which there is generated a linked-list structure of tuples forming a tree at the request of a process running at single node or processes across multiple nodes of a single CNS system or multiple CNS systems.

FIG. 9 depicts a status of a CNS system 900 in which there is generated an example structure of tuples 925 forming a tree or a like hierarchy of tuples. In an embodiment, the CNS controller at a node generates a tree structure 925 of tuple records at the request of processes running at single node, or processes running on multiple nodes of a single CNS system or across multiple CNS systems. This is done by provisioning more 64 bit next pointer links in each tuple record.

In the embodiment shown in FIG. 9, a CNS controller at a node of the CNS system 900 provides the iterator for creating/accessing a tree structure of NDEs, e.g., tuple records. In FIG. 9, an example linked list structure 925 generated by a CNS controller includes hash elements 515A, 515B, 515N associated with different tuple names, e.g., Key 1, Key 2 and Key3. Each respective hash element 515A, 515B, 515N includes a respective LT pointer element 516, 616, 716 each pointing to a respective first element 571, 671 and 771 of the respective circular doubly linked list 541, 641, 741 of local tuple records. At each linked list structure 541, 641, 741 associated with hash elements 515A, 515B, 515N, corresponding to different tuple keys, e.g., Key1, Key2 and Key3, is a respective tuple record 580, 680, 780 stored in near memory. Each respective tuple record 580, 680 and 780 have respective local LT metadata fields 585, 685 and 785 with respective pointers pointing to respective data 599, 699, 799 stored in near memory. Each respective stored data 599, 699, 799 can be different values.

In embodiments, each tuple record 580, 680, 780 is generated by the CNS controller at a respective node to include a respective pointer to one or more "next" tuples at a "next" or lower level of the tree 925. For example, a first tuple record 580 corresponding to tuple name Key 1 can represent a top level of the tree and includes a first "next" pointer 593 creating a link 594 to a second tuple record 680 corresponding to tuple name Key 2 at the next (child) level of the tree. In an embodiment, the CNS controller adds one or more additional linked keys at the tuple record for configuring a tree structure within the tuple database.

As shown in FIG. 9, there is added at the first tuple record 580 a second "next" pointer 596 creating a link 597 to a third tuple record 780 corresponding to tuple name Key 3 at the same (child) level of the tree as tuple record 680.

The third tuple 780 of the tree 925 includes a "next" pointer 793 creating a link to a further tuple record, e.g., at a next child level of the tree at a same or different node of the CNS system. In this embodiment, the "next" tuple pointers 593, 693, 793 point to the leaves in the next level of the tree wherein the leaves are other tuple records. Tree structures are commonly used in graph applications where its common to traverse a tree to find a particular node that has the information required in the algorithm. In embodiments, the data pointed to by a tuple record in the tree, e.g., Data1, can be NULL serving as just a structure node (e.g., branch of the tree.) A single node 12 in the distributed memory system invokes this type of iterator to generate/access the first element (e.g., corresponding to the top element of the tree of linked tuple records, e.g., tuple record 580) and retrieve the data associated with that record (e.g., Data 1). The iterator generates and uses the next pointers 593, 596 to access further tuple records and associated data, e.g., Data2 and Data3 at the next child level of the tree 925. As for the iterator, in an embodiment, an iterator can choose leaves based on some condition like timestamp, greater/less than a value, a sequence number, etc.

In the embodiments depicted in FIGS. 8-9, an iterator method employs pointer chasing by traversing the tuple records connected as a linked list or tree. An iterator method does not have to retrieve the data associated with the tuple. In certain embodiments—one may store the pointer in the data in which a sequence of instructions to retrieve the tuple record first and then the associated data to get the next pointer to the linked tuple. For linking tuples, one embodiment of a method is implemented as follows:

Given an array of data, e.g., data d0, d1, d2, d3, . . . , dn, corresponding tuple names (i.e., keys) are generated for each data element, e.g., keys k0, k1, k2, k3, . . . , kn. In a CNS without the linking of tuples, methods are typically invoked to create key value tuples, e.g., <k0,d0>, <k1,d1>, <k2, d2>, <k3,d3> . . . , <kn,dn>. However, in accordance with the embodiments depicted in FIGS. 8-9, methods are invoked at the CNS controller to generate multi-key tuples linked to data and specified according to:
<k0, k1,d0>, <k1, k2,d1>, <k2, k3,d2>, <kn,null,dn>

For example, CNS controller processing steps for linking a tuple1 record to a tuple2 record includes the creating of one tuple (k0, d0) and returning its local tuple pointer address (e.g., ltp1). This is now passed along when k1, d1 tuple is inserted, e.g., as <k0, k1,d0>, i.e., passes that address to creation of a second tuple. The second tuple (e.g., ltp2) is now passed back to the first tuple record when the CNS controller accesses it based on the provided ltp1. The methods create a Record 0 under hash element corresponding to k0 key, a Record 1 stored under hash element corresponding to k1 key, etc. Any subsequent request to access an NDE corresponding to k0, is also informed of the location for tuple name k1 within hash table. In embodiments, a relative index for this second link can be used. Using this iterator implementation, a process can "hop" from one meta data to another meta-data to the end of the linked list without having to access data.

In a further embodiment, another link can be added to make these links bi-directional specified according to:
<key,prev,next,data>

For example, <k0,null,k1,d0>, <k1,k0,k2,d1>, <k2,k1,k3, d2>, <k3,k2,k4,d3> . . . <kn,kn−1, null,dn> where the inner elements specify "next" field and "previous" field and are local tuple pointer addresses. The method is similar to the linking above, however the CNS controller in this embodiment, stores both the prev and next address in the tuple record. Thus, for example, tuple2 as described in the example embodiment would store the ltp1 in its "prev" field while tuple 1 would store ltp2 in its "next" field thereby enabling traversal of the list or tree backwards and forwards.

Figure 10:
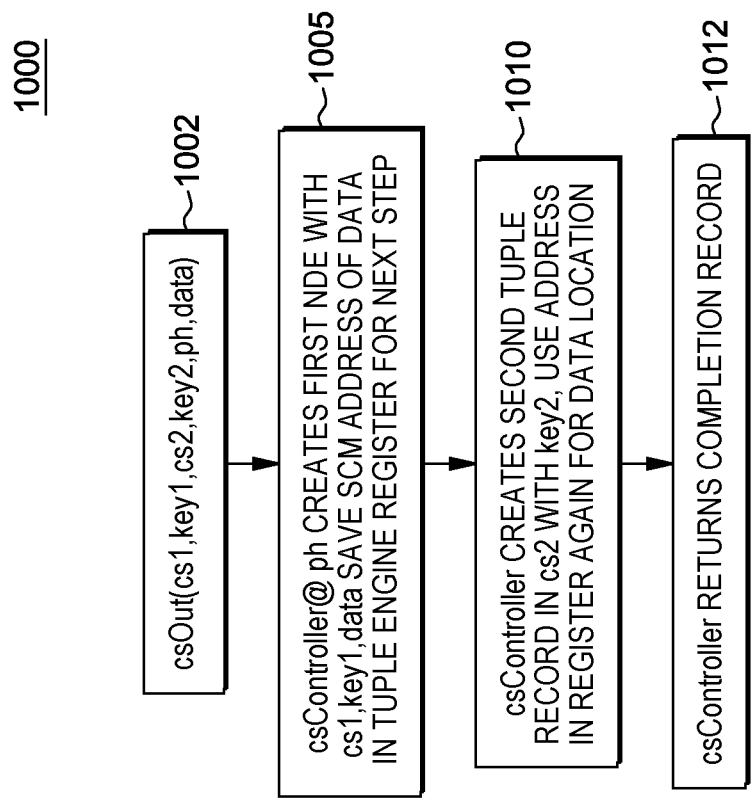
FIG. 10 depicts a method run at the CNS controller of a CNS system node for implementing a csOut API request to create new linked tuples using two sets of keys in two CNS systems in an embodiment.

FIG. 10 depicts a method 1000 implemented at the CNS controller of a CNS system node, e.g., a requesting unit performing a tuple command, and particularly a method implementing a csOut request to create new linked tuples using two sets of keys in two CNS systems. As shown, at a first step 1002, the CNS receives and responds to a CNS process csOUT( ) API request. The API request is to link two tuple records in two CNS systems according to an API command:

csOut(cs1,key1,cs2,key2,group,data)

where cs1 and cs2 specify CNS distributed memory systems, key1 and key2 specify the tuple names of the respective NDEs being created, "group" is an optional parameter indicating of the preferred home for the tuple (e.g., the tuple's natural home obtained from the hash of the tuple name), and data represents the data to be shared by the created NDEs.

In a further embodiment, the csOut( ) command may specify an additional 'grp' parameter to specify a preferred home, i.e., a unit identified by a user-specified group. For example, the 'grp' parameter will specify where to create the tuple for an csOut and where to first look for a corresponding tuple for a csRD/csIN (if tuple not available at Preferred-Home, the NaturalHome will service the request).

Continuing at 1005, the CNS Controller tuple engine at the preferred home creates a first NDE (i.e., tuple record) cs1, key1 specifying the CNS system (e.g., CNS 1) and corresponding to tuple name (e.g., KEY 1) and the associated data to be shared is moved from a local space to the CNS space. Further, at 1005, the address for the stored data (e.g., address in near memory or SCM), is saved in a tuple engine register for a next step in the process.

Further, at 1010, responsive to the received csOUT( ) request, the tuple engine at the CNS Controller further creates a second tuple record with cs2 specifying the CNS system (e.g., CNS 2) and corresponding to tuple name ((e.g., KEY 2). At this time, the address corresponding to the data location stored in the tuple register (associated with key1) is added to the second tuple record so it points to the corresponding data location as key 1 tuple record. In the example depicted in FIG. 10, only two cs/key pairs are provided. In this embodiment, providing multiple cs/key pairs as parameters of the csOut, the tuple data is only stored once and can be accessed with many tuple key names.

Further, the tuple engine adds a pointer (link) to key 1 tuple record by adding a local tuple pointer to the Key 1 tuple record that points to the local tuple record of Key 2 as described herein with respect to FIGS. 6-9. Finally, at 1012, the CNS controller returns a completion record to the requesting node.

In a further embodiment, the CNS controller at the node may receive an update tuple record request where if a key 1 tuple record is already existing, the tuple engine updates the key 1 local tuple pointer to a second record within the same CNS, e.g., with the local tuple pointer of key 2, or to a tuple record created in another CNS (e.g., CNS3). For example, a csOut_update(cs1,key1,ttag,cs3,key3) configures the CNS controller to link existing tuple record at cs1, key1 to another tuple record named Key3 in CNS3 where "ttag" represents a tuple tag and is a pointer to a specific tuple record of the circular doubly-linked structure and is used to identify the specific tuple record if multiple such records exists for the same tuple name.

Figure 11:
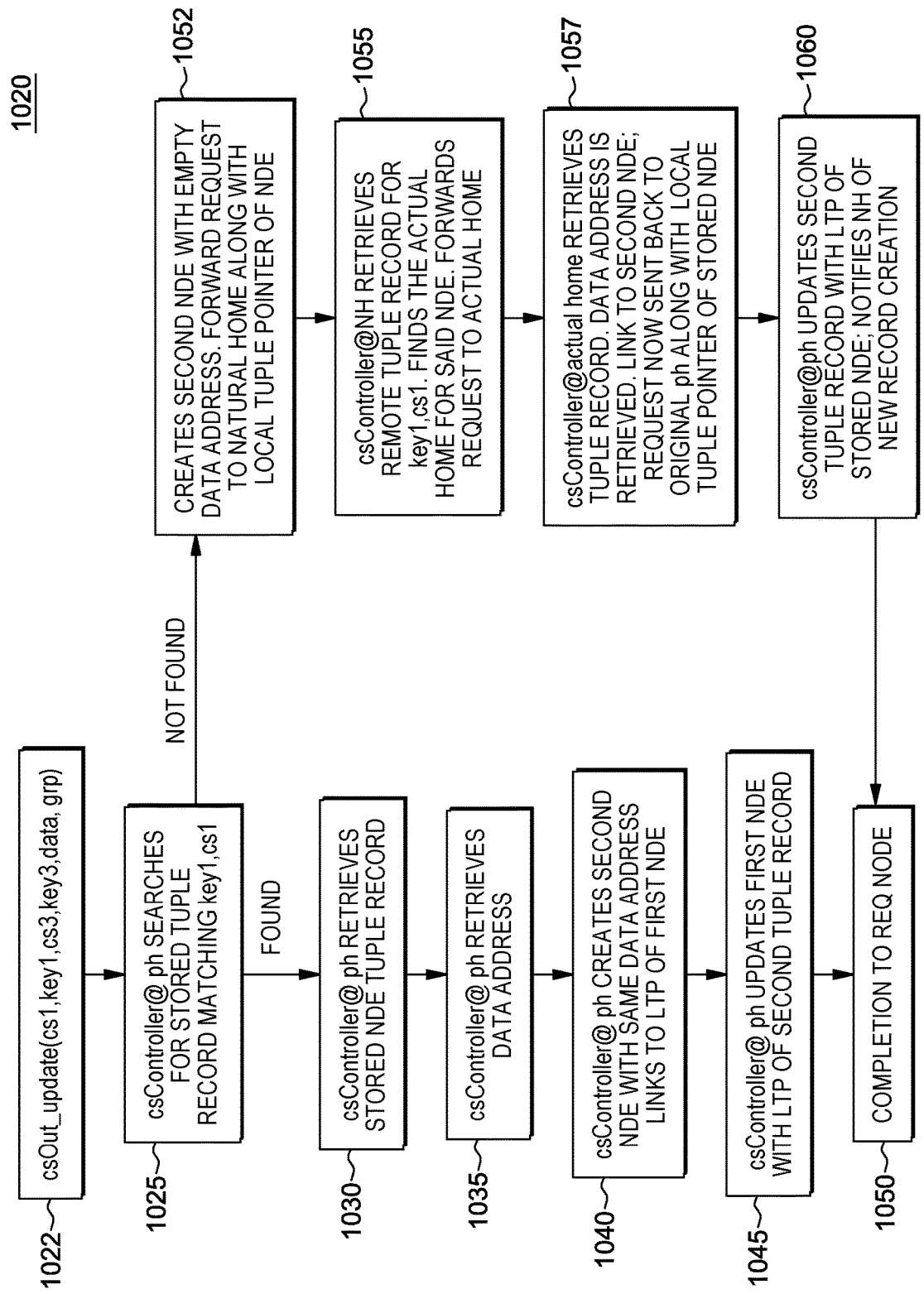
FIG. 11 depicts a method implemented at the CNS controller of a CNS system node for implementing a csOut API update request to update an existing record of the linked tuples using two sets of keys in two CNS systems in an embodiment.

FIG. 11 depicts a method 1020 implemented at the CNS controller of a CNS system node, e.g., a requesting unit performing a tuple command, and particularly a method implementing a csOut_update request to update an existing record of the linked tuples using two sets of keys in two CNS systems. As shown, at a first step 1022, the CNS receives and responds to a CNS process csOut_update( ) API request which is a request to update a tuple record to link it to another tuple records in the same or different CNS system according to:

csOut_update(cs1,key1, ttag, cs3,key3,data, grp)

where cs1 specifies the CNS distributed memory system and key1 the tuple name of the tuple record to be updated with a link to a second tuple record, and CNS 3 and key3 specify the respective CNS system and tuple name of the second tuple record to be linked, "grp" is a user-specified group which could be a preferred home, and "data" represents the data to be shared by the created NDEs. The parameter "ttag" represents a tuple tag for identifying the specific tuple record if multiple such records exist for the same tuple name. This tag could have been returned when an original csOut was issued or as a return value from the csOut operation to create a tuple. The local tuple pointer ltp could, in addition, be used for this.

Responsive to receipt of the csOut_Update( ) API request received from a requesting node, at 1025, the CNS Controller tuple engine at the preferred home searches for stored tuple record matching key1, cs1 and ttag associated with the tuple to be linked. If the key1, cs1 tuple record is not found (or not created) the process proceeds to step 1052. Otherwise, at 1025, if the first tuple record exists (an NDE created) at the PH for the cs1, key1, the process proceeds to 1030, FIG. 11, where the tuple engine at the preferred home retrieves the stored NDE tuple record. Then, at 1035, the CNS Controller tuple engine at the preferred home retrieves the data address of the first tuple record (corresponding to key1, cs1) and at 1040, at the preferred home, creates a second NDE (corresponding to key3, cs3) with the same data address and links this second NDE to a local tuple pointer of the first NDE. Then, at 1045, the CNS Controller tuple engine at the preferred home updates the first NDE with the local tuple pointer of the second tuple record. Finally, at 1050, the tuple engine generates a completion indication to the requesting node.

Returning to step 1025, FIG. 11, if after searching, it is determined that the first NDE (first tuple record) is not found, then the process proceeds to 1052, where the tuple engine creates a second NDE with empty data address and forwards the request to the natural home along with Local tuple pointer of that NDE. That is, a new hash element is created for the specified tuple name (Key2) and a pending record is created for association with that hash element by linking the pending record to the circular doubly linked structure of local tuples. Then, at 1055, the CNS Controller tuple engine at the NH retrieves remote tuple record for key1,cs1, finds the actual home (AH) for the first NDE and forwards the request to the AH unit containing the requested tuple. Continuing to 1057, the CNS Controller tuple engine at the actual home retrieves tuple record for key1, cs1, retrieves its data address, and links that to the second NDE (second tuple record). The request is then sent back to the original PH along with local tuple pointer of the stored NDE. Continuing to 1060, the CNS Controller tuple engine at the PH then updates the second tuple record with the local tuple pointer of the stored NDE and notifies the NH of new record (cs3, key3) creation before generating a completion indication to the requesting node at 1050.

Figure 12:
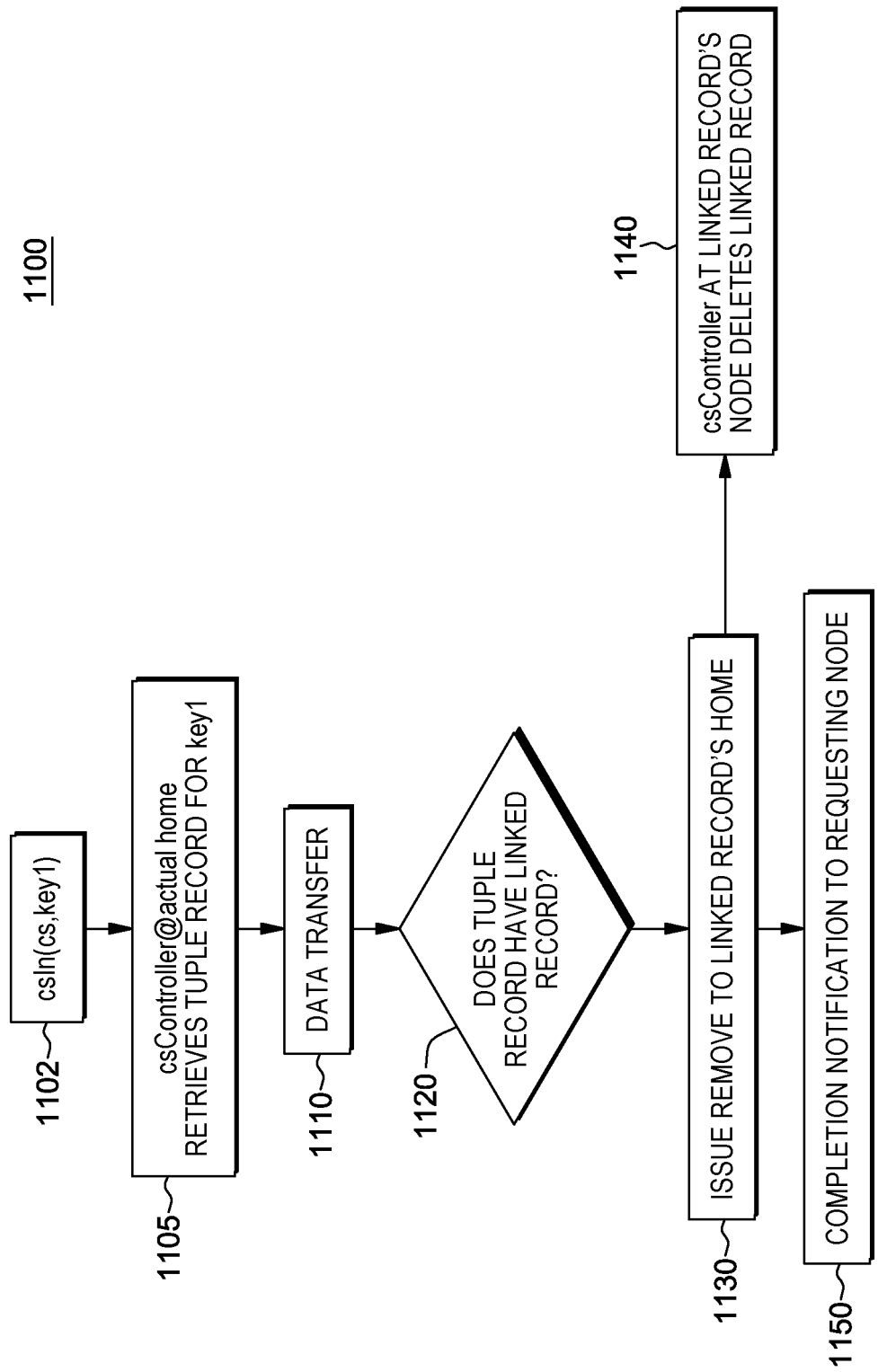
FIG. 12 depicts a method implemented at the CNS controller of a CNS system node for implementing a csIN( ) API request to read and/or remove a matching tuple that is interlinked with another tuple.

FIG. 12 depicts a method 1100 implemented at the CNS controller of a CNS system node, e.g., a requesting unit performing a tuple command, and particularly a method implementing a csIN( ) request to read and/or remove a matching tuple, e.g., an existing record, of the linked tuples, according to:

csIn(cs1,key1), or alternatively cs1*n*(cs,key2)

where cs specifies the CNS distributed memory system (can be either cs1 or cs2) and key1 the tuple name of the tuple record to be read/removed and key2 the tuple name of a second tuple record linked to another tuple record (e.g., corresponding to key1).

At 1102, responsive to receipt of the csIn(cs1,key1) API request received from a requesting node, at 1105, the CNS Controller tuple engine at the AH, retrieves the tuple record for key1.

If there is a local tuple pointer field to another tuple record, then at 1110 the tuple engine access the linked data and performs a data transfer process for the requesting node to read the shared data. Then at 1120, tuple engine at the AH performs a determination as to whether the requested tuple record for key1 has a linked record. This is performed by accessing the local tuple record and whether there is a local tuple pointer field to another tuple record.

The next step 1130 depicts the CNS controller tuple engine then receiving a csRemove( ) API request to the linked record's home to initiate removing a linked tuple from the corresponding CNSs. In response, at 1140 the controller for the linked record deletes the linked record. Otherwise, if there was not linked record at 1130, the process proceeds to step 1150 to generate a completion notification to requesting node that the tuple record for key1 has been read/removed and shared data transferred.

In an embodiment, the csIn(cs1,key1) API will cause the CNS controller tuple engine to remove the key1 tuple from the specified first CNS from a second tuple part of a second linked CNS, i.e. de-link two tuple records. Alternatively, a csRevoke (cs1,key1,ttag) API will configure the CNS controller to remove tuples from the first CNS, e.g., tuple record for key1, CNS 1, but keep the linked tuple record and data for use by the second linked tuple in a second CNS.

Thus, in an example, given a tuple record for Key 1 (tuple name 1) and a linked tuple record for Key2 (tuple name 2) an csIn/csRead access by key1 configures the tuple engine to csRead/csIn as would be normally done for any tuple record, and will check for the presence of a local tuple pointer (ltp) field that points to key2 tuple record. If the pointer is present, then the CNS controller will initiate, if a csIn command, the further deletion of the key2 ltp, In an embodiment, the CNS controller will write a "null" in the next field of tuple 1 record. If it's a bidirectional list, the controller will further access tuple2 record using the ltp that was present in the next field before being wiped. CNS controller will write a null in the previous field.

For a multi-key tuple, for a csRead access by key2, then the CNS controller will access tuple record for key2 and read the data. Since the data is not removed, nothing needs to be done to any linked tuples. For an csIn access request by key 2, then the CNS controller will access tuple record for key2 and find that it is linked to key1 tuple record via the key1 ltp. The CNS controller will remove the key2 tuple record, move the data to user space and then access tuple record for key1 from the prev ltp field present and delete the tuple1 record as well.

In embodiments, as described in applicant's commonly-owned co-pending U.S. patent application Ser. No. 16/719, 397, the system and methods are implemented to detect an instance when a tuple data is read by a first process, e.g., process 1, issuing a csRD( ) command and detect when a second process, e.g., process 2, that is linked to the first process 1, issues a csIn( ) to read and remove the tuple and possibly reinsert a new data value. Upon the detecting, the linking and sharing of tuple records enables the process 1 to be notified of the update or removal. This way process 1 can decide to retrieve the tuple record again.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

Having thus described our invention, what we claim as new, and desire to secure by Letters Patent is:

1. A method for sharing data generated by a plurality of processes running at one or more distributed computing nodes, said method comprising:
   receiving, at a controller at a current node, a request message to share data associated with a first process running at nodes in a computing system;
   generating, by the controller, in response to said request, a first key-value storage tuple record for storage in a memory, said first tuple record having a metadata field including a pointer pointing to a memory storage location for storing a first associated data generated by the first process, said first tuple record identified according to a first tuple name;
   generating, by the controller, a second key-value storage tuple and associated second tuple record for storage in the memory, said second tuple record identified according to a second tuple name, said second tuple record having a metadata field including a pointer pointing to the same memory storage location of said first associated data;
   obtaining, by the controller, an address location of the second tuple record stored in the memory;
   creating, by the controller, a first pointer link in the first tuple record, said first pointer link pointing to the address location of said second tuple record in said memory for linking said first key-value storage tuple record to the second key-value storage tuple record, and creating, by the controller, a second pointer link in the second tuple record, said second pointer link pointing to an address location of said first tuple record in said memory for linking said second key-value storage tuple record to the first key-value storage tuple record, wherein said first associated data is stored once.

2. The method according to claim 1, wherein said first tuple record and said second tuple record are created by said controller at one or more nodes of a distributed storage memory of a single communication namespace (CNS) system.

3. The method according to claim 1, wherein said first tuple record and said second tuple record are created by said controller at first and second nodes of a distributed storage memory, said first node identified as part of a first communication namespace system and said second node identified as part of a second communication namespace (CNS) system.

4. The method according to claim 1, wherein said controller receives a multi-key tuple command, said multi-key tuple command comprising a parameter specifying the first tuple name, a parameter specifying the second tuple name, and parameters specifying a first coordination namespace in which the first tuple record according to the first tuple name is created, and a parameter specifying a second coordination namespace in which the second tuple record according to the second tuple name is created.

5. The method according to claim 4, wherein said controller is responsive to the multi-key tuple command request for generating a linked list of tuple records, wherein each pointer link points to an address of another tuple record belonging to said linked list.

6. The method according to claim 4, wherein said controller is responsive to the multi-key tuple command request for generating a tree structure of linked tuple records, said method further comprising:
adding additional pointer links to a tuple record, wherein each additional pointer link added points to a different tuple record of a tree structure of linked tuple records.

7. The method according to claim 1, further comprising:
receiving, by the controller, a request to access data stored at a tuple record specifying both said first tuple name and second tuple name, said controller responsive to said request by searching for a tuple record associated with either the first tuple name or second tuple name, wherein the controller accesses a first tuple record according to said first tuple name and references the first associated data in addition to the first pointer linking to the second tuple record, or accesses said second tuple record according to said second tuple name and references the second associated data in addition to the second pointer linking to said first tuple record.

8. The method of claim 1, further comprising:
deleting, by the controller, the first tuple responsive to the first tuple name; and
prior to deleting, obtaining a local tuple pointer from the pointer information stored in first tuple record that points to the second tuple; and
deleting the second tuple pointed to by said local tuple pointer.

9. The method as claimed in claim 1, further comprising:
allocating, responsive to a received request message to share associated data, a named data element corresponding to the first tuple name in said coordination namespace at a current node, and
storing, at one or more associated memory locations of said named data element, first key-value tuple data records for said first tuple name according to a circular linked list structure, said first key-value storage tuple records including pointers to tuple data values corresponding to data generated data from any more local processes specifying said first tuple name,
wherein responsive to receiving said request to share data, said method further comprising:
first determining whether a hash table element has been created for said first tuple name, and if a hast table element has been created,
locate a pointer to a last element of the circular linked list;
generate a key-value tuple record having a tuple data value associated with the first tuple name; and
append the tuple record having a pointer to the associated first tuple data value to an end of the circular linked list structure;
otherwise, if a hash table element has not been created for said first tuple name, then:
applying, by the controller, a hash function to said first tuple name to obtain a hash value, and
using, by the controller, said hash value as an index into a hash table element, said hash table element comprising a pointer to a last element of the circular linked list structure in said associated one or more memory locations of said named data element.

10. A system for sharing data generated by a plurality of processes running at one or more distributed computing nodes, said system comprising:
a controller circuit associated with a current node of said multi-node computing system, said controller circuit configured to perform a method to:
receive a request message to share data associated with a first process running at nodes in a computing system;
generate in response to said request, a first key-value storage tuple record for storage in a memory, said first tuple record having a metadata field including a pointer pointing to a memory storage location for storing a first associated data generated by the first process, said first tuple record identified according to a first tuple name;
generate a second key-value storage tuple and associated second tuple record for storage in the memory, said second tuple record identified according to a second tuple name, said second tuple record having a metadata field including a pointer pointing to the same memory storage location of said first associated data;
obtain an address location of the second tuple record stored in the memory;
create a first pointer link in the first tuple record, said first pointer link pointing to the address location of said second tuple record in said memory for linking said first key-value storage tuple record to the second key-value storage tuple record, and
create a second pointer link in the second tuple record, said second pointer link pointing to an address location of said first tuple record in said memory for linking said second key-value storage tuple record to the first key-value storage tuple record, wherein said first associated data is stored once.

11. The system according to claim 10, wherein said first tuple record and said second tuple record are created by said controller at one or more nodes of a distributed storage memory of a single communication namespace (CNS) system.

12. The system according to claim 10, wherein said controller is further configured to:
generate said first tuple record and said second tuple record at respective first and second nodes of a distributed storage memory, said first node identified as part of a first distributed memory communication namespace system and said second node identified as part of a second distributed memory communication namespace (CNS) system.

13. The system according to claim 10, wherein said controller is further configured to:
respond to a multi-key tuple command request, said multi-key tuple command request comprising a parameter specifying the first tuple name, a parameter specifying the second tuple name, and parameters specifying a first coordination namespace in which the first tuple record according to the first tuple name is created, and a parameter specifying a second coordination namespace in which the second tuple record according to the second tuple name is created.

14. The system according to claim 13, wherein said controller is further configured to:
respond to the multi-key tuple command request for generating a linked list of tuple records, wherein each pointer link points to an address of another tuple record belonging to said linked list.

15. The system according to claim 13, wherein said controller is further configured to:
respond to the multi-key tuple command request for generating a tree structure of linked tuple records, said tree structure generating comprising:
adding additional pointer links to a tuple record, wherein each additional pointer link added points to a different tuple record of a tree structure of linked tuple records.

16. The system according to claim 10, wherein said controller is further configured to:
receive a request to access data stored at a tuple record specifying both said first tuple name and second tuple name; and
respond to the request by searching for a tuple record associated with either the first tuple name or second tuple name, wherein the controller accesses a first tuple record according to said first tuple name and references the first associated data in addition to the first pointer linking to the second tuple record, or accesses said second tuple record according to said second tuple name and references the second associated data in addition to the second pointer linking to said first tuple record.

17. The system according to claim 10, wherein said controller is further configured to:
delete the first tuple responsive to the first tuple name; and
obtain, prior to deleting, a local tuple pointer from the pointer information stored in first tuple record that points to the second tuple; and
deleting the second tuple pointed to by said local tuple pointer.

18. The system according to claim 10, wherein said controller is further configured to:
allocate, responsive to a received request message to share associated data, a named data element corresponding to the first tuple name in said coordination namespace at a current node, and
store, at one or more associated memory locations of said named data element, first key-value tuple data records for said first tuple name according to a circular linked list structure, said first key-value storage tuple records including pointers to tuple data values corresponding to data generated data from any more local processes specifying said first tuple name,
wherein responsive to receiving said request to share data, said controller is further configured to:
first determine whether a hash table element has been created for said first tuple name, and if a hast table element has been created,
locate a pointer to a last element of the circular linked list;
generate a key-value tuple record having a tuple data value associated with the first tuple name; and
append the tuple record having a pointer to the associated first tuple data value to an end of the circular linked list structure;
otherwise, if a hash table element has not been created for said first tuple name, then:
apply a hash function to said first tuple name to obtain a hash value, and
use said hash value as an index into a hash table element, said hash table element comprising a pointer to a last element of the circular linked list structure in said associated one or more memory locations of said named data element.

* * * * *